United States Patent
Zhang et al.

(10) Patent No.: US 7,797,381 B2
(45) Date of Patent: Sep. 14, 2010

(54) METHODS AND APPARATUS FOR INFORMATION HYPERCHAIN MANAGEMENT FOR ON-DEMAND BUSINESS COLLABORATION

(75) Inventors: Liang-Jie Zhang, Cortlandt Manor, NY (US); John Youssef Sayah, Sleepy Hollow, NY (US); Tian-Jy Chao, Bedford, NY (US); Ying Nan Zuo, Beijing (CN); Shun Xiang Yang, Beijing (CN); Jing Min Xu, Beijing (CN); Yiming Ye, White Plains, NY (US); Haiyan Wang, legal representative, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 1182 days.

(21) Appl. No.: 10/665,699

(22) Filed: Sep. 19, 2003

(65) Prior Publication Data

US 2005/0065903 A1    Mar. 24, 2005

(51) Int. Cl.
 *G06F 15/16* (2006.01)
 *G06Q 10/00* (2006.01)
(52) U.S. Cl. .................. 709/204; 709/206; 705/1.1
(58) Field of Classification Search .......... 709/204, 709/206; 705/1
 See application file for complete search history.

(56) References Cited

U.S. PATENT DOCUMENTS

| | | | |
|---|---|---|---|
| 5,821,925 A | | 10/1998 | Carey et al. |
| 6,513,059 B1 | | 1/2003 | Gupta et al. |
| 6,611,835 B1 | * | 8/2003 | Huang et al. ................ 707/10 |
| 6,687,878 B1 | * | 2/2004 | Eintracht et al. ............ 715/201 |
| 2002/0089551 A1 | * | 7/2002 | Hugh et al. ................ 345/853 |
| 2002/0107710 A1 | | 8/2002 | Takizawa et al. |
| 2002/0144152 A1 | | 10/2002 | Ikeda |
| 2002/0156693 A1 | * | 10/2002 | Stewart et al. ............... 705/26 |
| 2003/0023679 A1 | * | 1/2003 | Johnson et al. ............. 709/204 |
| 2003/0097410 A1 | * | 5/2003 | Atkins et al. ............... 709/206 |
| 2005/0096951 A1 | | 5/2005 | Ye et al. |

FOREIGN PATENT DOCUMENTS

| | | |
|---|---|---|
| EP | 1187350 A2 | 3/2002 |
| EP | 1187350 A3 | 2/2003 |
| WO | WO00/13100 | 3/2000 |

(Continued)

OTHER PUBLICATIONS

G. Fisher et al., "Adding Rule Based Reasoning to a Demonstrational Interface Builder," Proceedings of UIST '92, Nov. 1992, pp. 89-97.

(Continued)

*Primary Examiner*—Nathan Flynn
*Assistant Examiner*—Jeong S Park
(74) *Attorney, Agent, or Firm*—Lee Law, PLLC; Christopher B. Lee

(57) ABSTRACT

Hyperchain information management techniques are provided for use in applications such as on-demand business collaboration. In accordance with such techniques, a hyperchain annotation methodology is provided. Such an annotation methodology enables interaction between loosely-coupled business processes or interacting partners and business entities. Annotated information components and process components for collaboration may be expressed as links. Further, techniques for realizing an on-demand message exchange, embedded status/state information, flexible collaborative business message exchange patterns, and a collaborative directory are provided.

36 Claims, 12 Drawing Sheets

FOREIGN PATENT DOCUMENTS

| | | |
|---|---|---|
| WO | WO01/88807 A2 | 11/2001 |
| WO | WO01/88807 A3 | 11/2001 |

OTHER PUBLICATIONS

Andreas Abecker, Ansgar Bernardi, Spyridon Ntioudis, Gregory Mentzas, Rudi Herterich, Christian Houy, Stephan Müller, Maria Legal, The Decor Toolbox for Workflow-Embedded Organizational Memory Access, Article, Jul. 2001, pp. 1-8, vol. 1, The 3rd International Conference on Enterprise Information Systems ICEIS 2001, Setúbal, Portugal.

* cited by examiner

FIG. 10

| Home | Products & services | Support & downloads | My account |

Design Collaboration Portal

Create a new design task for design project "T61". Click "Save" first and then choose to edit the detailed information of the task.

Basic Information

| | |
|---|---|
| Task ID | T61_ASIC |
| Task Name | ThinkPad T61 ASIC Chip Design |
| Organization ID | YDT |
| Creation Date | 2002-11-05 |
| Partner ID | NEC |
| Partner Role | Design Partner ▼ |
| Description | A design project for ThinkPad T61. |

[ Save ]   [ Reset ]

FIG. 11

| Home | Products & services | Support & downloads | My account |

Design Collaboration Portal

Please finish the following steps to create a new RFD.

Step1: Design Requirement Annotation

Requirement Annotation List

| Annotation List | Annotation Name | Annotation Value |
|---|---|---|
| ☑ | CPU Frequency ▼ | 1G |
| ☑ | CPU Type ▼ | Intel P4 |

[Remove] [Add New]

[Reset] [Next]

FIG. 12

Design Collaboration Portal

Home | Products & services | Support & downloads | My account

Add specification to the requirement for task "...".

Step2: Requirement Specification Annotation

Specification List

| Name | Location |
|---|---|
| Requirement-1 | D:\Work\ThinkPadDesign\Requirement-1... |
| Requirement-2 | D:\Work\ThinkPadDesign\Requirement-2... |

Specification & Annotation Detail

Location: D:\Work\ThinkPadDesign\Requirement-3...

| Annotation List | Annotation Name | Annotation Value |
|---|---|---|
| ☑ | File Type ▼ | PDF |
| ☑ | Creator ▼ | John |

Remove | Add New

Reset | Insert to the list

Back | Next

FIG. 13

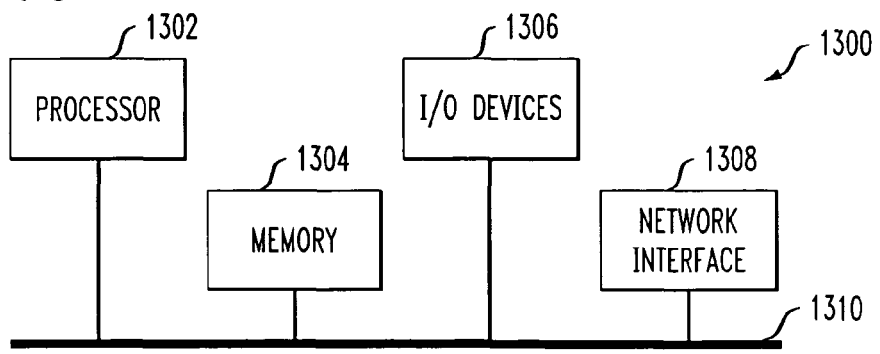

METHODS AND APPARATUS FOR INFORMATION HYPERCHAIN MANAGEMENT FOR ON-DEMAND BUSINESS COLLABORATION

FIELD OF THE INVENTION

The present invention generally relates to information management techniques and, more particularly, to techniques for information hyperchain management for use in applications such as on-demand business collaboration.

BACKGROUND OF THE INVENTION

Nowadays, a business entity or enterprise is not standalone anymore. Thus, an enterprise does not need to produce everything it needs. As a result, an enterprise can outsource portions of its business to its business partners.

For example, in an engineering design collaboration scenario, many manual or semi-automated operations exist in the design process. Each enterprise participating in the design collaboration needs to work with its logistic service providers and customers to keep its operations running well. An enterprise may typically leverage some well-proven services and products to be part of its daily operation process or a new product design process.

In a new product design, by way of example, the enterprise that is designing products has to work with component suppliers, electronic manufacturing services (EMS) or contract manufacturers to design a product collaboratively. Some component design work may be outsourced to design partners who specialize in fabrication of a special component such as an application-specific integrated circuit (ASIC), a battery, or a motherboard.

This kind of outsourcing model becomes more and more useful in the information technology (IT) industry and business transformation industry. It is the outsourcing model that enables disaggregated businesses to create more innovative and higher quality products or services than that they would have accomplished on their own.

However, the real technical obstacles to an effective outsourcing model are not the business process representation and data transformation. The real problem is the interactions between two or more loosely coupled business processes, which could be private business processes in their own enterprises or public processes across multiple enterprises.

For example, returning to the above-mentioned engineering design collaboration scenario, there are several manual or semi-automated operations in the product design process. Participants use phone, fax, or email to exchange design specification documents and design files such as electronic and mechanical computer aided design (CAD) files, as well as bill of material (BOM) files. The resulting problem is that it is very hard to get real-time information from the design network, such as information associated with monitoring of the status of on-going projects, tasks and exchanged documents.

Additionally, there are different design systems and product development management (PDM) systems with different formats for design documents and design specifications. Moreover, the traditional workflow only documents the detailed steps of a known process. But for a product innovation, nobody really knows all the details of the design for each individual component. Therefore, it is a non-deterministic workflow that involves multiple collaborators who are specializing in their domain components. Further, many business exceptions need to be addressed during the full life cycle of a product design process.

Furthermore, in current business-to-business (B2B) application scenarios, vast numbers of documents have to be transmitted to receivers in different enterprises. The documents need to be delivered to the proper people with appropriate responses. However, each document can be delivered to any receiver. From the original sender's point of view, he or she may not know who else will be a receiver. Thus, a document delivery channel across multiple enterprises, or even within one organization, forms a non-structural and non-deterministic information exchange flow.

Therefore, as is evident, with the rapid growth of requirements of business process integration, how to efficiently and effectively manage non-structural and non-deterministic information exchange in a uniform way is a challenging issue. More specifically, the following are examples of problems in existing information exchange techniques:

1) Lack of a uniform annotation mechanism that represents the control information separated from the real documents to be exchanged;

2) Lack of a comprehensive collaboration pattern that covers all aspects of a non-structural and non-deterministic information exchange flow;

3) Lack of an efficient on-demand information mechanism that dynamically locates resources from a non-structural relationship graph, as well as intelligently aggregates data from multiple sources; and 4) Lack of a trackable information embedding mechanism for visibility control that addresses key issues associated with data exchange in collaborative environment.

Therefore, a need exists for improved information management techniques for use in applications such as on-demand business collaboration.

SUMMARY OF THE INVENTION

The present invention provides hyperchain information management techniques for use in applications such as on-demand business collaboration.

In a first aspect of the invention, an annotation methodology is provided. For example, a method for use by at least one entity in participating in a collaborative information exchange with at least one other entity comprises the steps of: (i) obtaining annotation data, the annotation data comprising one or more links to information associated with the collaborative information exchange; and (ii) transmitting at least a portion of the annotation data to the at least one other entity such that the at least one other entity may access at least a portion of the information associated with the collaborative information exchange by selecting at least one of the one or more links. Such an annotation methodology may enable interaction between loosely-coupled business processes or interacting partners and business entities. Annotated information components and process components for collaboration may be expressed as links. Such an annotation methodology may also be deployed as a service that is provided to customers by a service provider.

In a second aspect of the invention, an on-demand message exchange is provided. Data is not required to be aggregated before being sent. Thus, data can be later retrieved on a need basis, i.e., send fragmented data. For instance, schema-less hyperchain annotation data may be sent first, and then detailed information is fetched later. Examples of such detailed information may include opportunity data, project management notifications, design files, design specifications, BOM files based on the roles of the receiver (on-demand data access/transfer).

In a third aspect of the invention, status/state information is embedded in messages transmitted. This feature enables status tracking both for collaborative processes (e.g., project/product management) and for documents (e.g., design files, BOM files, etc.). Such information may be used to notify (via message exchange) an entity or authority about status or some actions that have been taken or need to be taken. Annotation data may also be used for this purpose. Notifications may be electronic (e.g., email) or traditional (e.g., mail).

In a fourth aspect of the invention, flexible collaborative business message exchange patterns are provided. Such patterns may comprises collaborative business constructs, which include multiple collaborative business primitives and business constructs. Thus, payload information can be opaque and need not be pre-defined types. Further, a standardized way to contain non-standard data is provided, e.g., allowing multiple bi-lateral collaborations without having to go through standard bodies.

In a fifth aspect of the invention, a collaborative directory is provided. This may include ontology persistent storage for partner, project and service profiling. Access control requirement may utilize identity management directory integration functions. Further, the invention provides for web services-enabled utilities in a collaborative directory.

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 10 is a diagram illustrating a graphical user interface associated with annotation creation for a resource, according to an embodiment of the present invention;

FIG. 11 is a diagram illustrating a graphical user interface associated with creating an outsourcing task according to an embodiment of the present invention;

FIG. 12 is a diagram illustrating a graphical user interface associated with annotation creation for design requirements, according to an embodiment of the present invention; and FIG. 13 is a diagram illustrating an illustrative hardware implementation of a computing system in accordance with which one or more components/methodologies of the present invention may be implemented, according to an embodiment of the present invention.

DETAILED DESCRIPTION OF PREFERRED EMBODIMENTS

Figure 1:
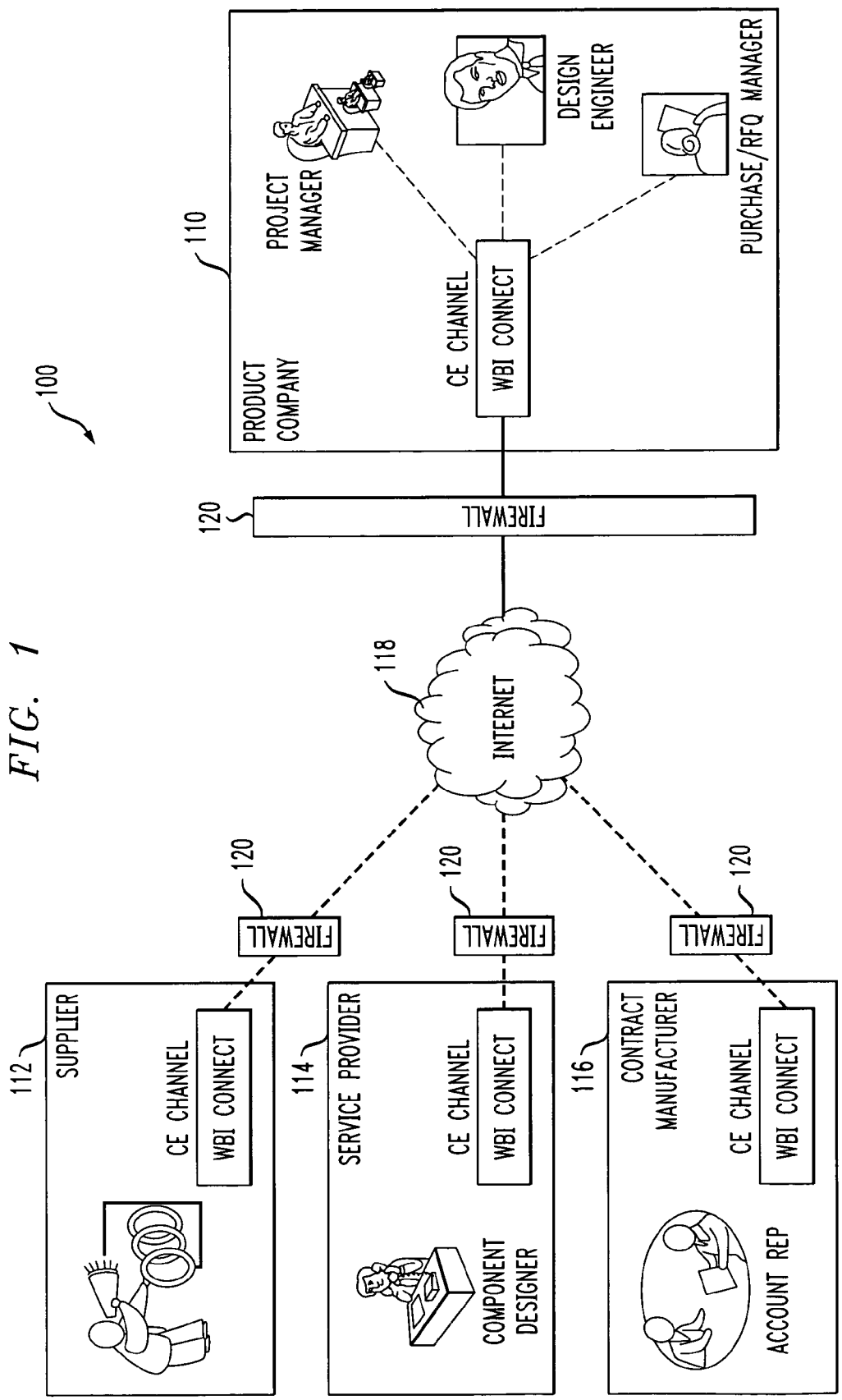
FIG. 1 is a diagram illustrating an exemplary architecture of a distributed peer-to-peer collaboration system within which the present invention may be implemented, according to an embodiment of the present invention.

The following description will illustrate the invention using an exemplary engineering design collaboration application. It should be understood, however, that the invention is not limited to use with any particular application. Rather, the invention is more generally applicable to any application in which it is desirable to provide efficient and effective information management techniques in a collaborative environment, e.g., B2B applications, etc.

By way of example, the term "hyperchain" may be considered to generally refer to an annotation technology that extends the concept of a hyperlink, as used in the individual objects in a HyperText Markup Language (HTML) file, to a business information management application including such concepts as business processes, collaboration areas, supporting documents exchange for heterogeneous data streams in outsourcing, process tracking, visibility control, etc.

Hyperchain annotation data can be employed by users by following the link and downloading the documents on a need basis. Such a mechanism may basically serve as a hierarchical annotation linkage. Every document in the business collaboration environment may be annotated by certain properties. Hyperchain annotations may be exchanged before any documents are exchanged. The receiver of hyperchain annotations can take actions accordingly so that document exchanges are on a demand (need) basis, which advantageously can reduce unnecessary communication traffic among the business collaboration community.

As will be illustratively described below, the present invention provides an on-demand information exchange model. Such a model is tailored to an individual recipient, and supports the capability of monitoring and tracking of information delivered and exchanged. Such a model is implemented in accordance with a hyperchain annotation technology referred to herein as On-Demand Information Exchange Model (ODIEM).

Hyperchains based on ODIEM serve to enable an e-business solution so as to automate the dynamic configuration and instantiation of business processes using predefined collaboration primitives and business constructs. In addition, the hyperchain technology provides a foundation to support flexible, distributed, secure peer-to-peer architectures of business collaboration (e.g., B2B) without the need of a central hub.

We use an engineering design collaboration scenario as an example to describe the hyperchain based information management for generic business collaboration. As mentioned above, with the rapid growth of the requirements of business process integration, efficiently and effectively managing non-structural information (e.g., information representation structures that are not predefined) exchange is an important issue.

More particularly, the present invention will be illustratively described below in the context of a Resource Description Framework or RDF (http://www.w3.org/RDF). That is, the invention provides a new type of annotation representation, referred to as "hyperchain RDF," for annotating a chain of design data, or design chain, the associated design documents, and the associated actions. Hyperchain RDF is a modeling system with facilities addressing of metadata exchange and it is near schema-less.

Therefore, one benefit of using hyperchain RDF is that there is no need to predefine schema for each application because it can accommodate data of various formats without having a fixed, predefined schema. Therefore, it is flexible and suitable for annotating different data types needed for business collaboration, such as design data, specifications, requirements, bill of materials, partner profiles, business processes such as reviewing, designing and project evaluation, access controls, collaboration patterns, as well as actions for status tracking, file exchange, and so on.

This remainder of the detailed description is organized as follows: First, there is described main components of a collaborative system, followed by mechanisms used to enable the extended business collaboration. Next, there is a description of a detailed structure of the ontology and the on-demand information delivery model for extended business collaboration.

Referring initially to FIG. 1, a diagram illustrates an exemplary architecture of a distributed peer-to-peer collaboration system within which the present invention may be implemented, according to an embodiment of the present invention. As shown, collaboration system 100 includes a product company 110 (with a project manager, a design engineer and a purchase/request for quote (RFQ) manager) which collaborates with one or more suppliers 112, one or more service providers 114 and one or more contract manufacturers 116 over a distributed network 118 such as the Internet. Each business entity or enterprise may be protected by a firewall 120. The enterprises communicate via Collaboration Extension (CE) channels in a B2B gateway such as WebSphere™ (trademark of International Business Machines Corporation, Armonk, N.Y.) Business Integration-Connect (WBI connects). However, enterprises are not limited to communicating over such channels and, therefore, may communicate over other channels and connection mechanisms.

Such an architecture is an example of a distributed information management solution which leverages web services technologies and gateway software for business process integration across multiple enterprises. The system generally operates as follows. Initially, documents to be exchanged are annotated with hyperlinks that point to a location where the real data can be downloaded or exchanged. The hyperlinks form a logical chain (hyperchain) of actions that the recipients can take to further delve into the details of the information and download information on a need basis.

That is, instead of bombarding the recipients will levels of documents to be exchanged all at once, the sender will first send the annotations only. Once the recipient receives the annotations, he or she can follow the hyperchain and take action according to their roles and authorizations in the enterprises, such as project manager, design engineer or purchase/RFQ manager, to download only those data that are needed.

In general, an on-demand information exchange model which enables implementation of the above-described operations is designed to achieve the following goals: (i) provides a flexible and uniform annotation representation for information exchange of various non-structured data without requiring pre-defined schemas; (ii) automates the annotation data generation process; and (iii) captures and automates business collaboration interaction patterns for information exchange based on the annotation data. Of course, such an inventive model may achieve various other goals.

Figure 2:
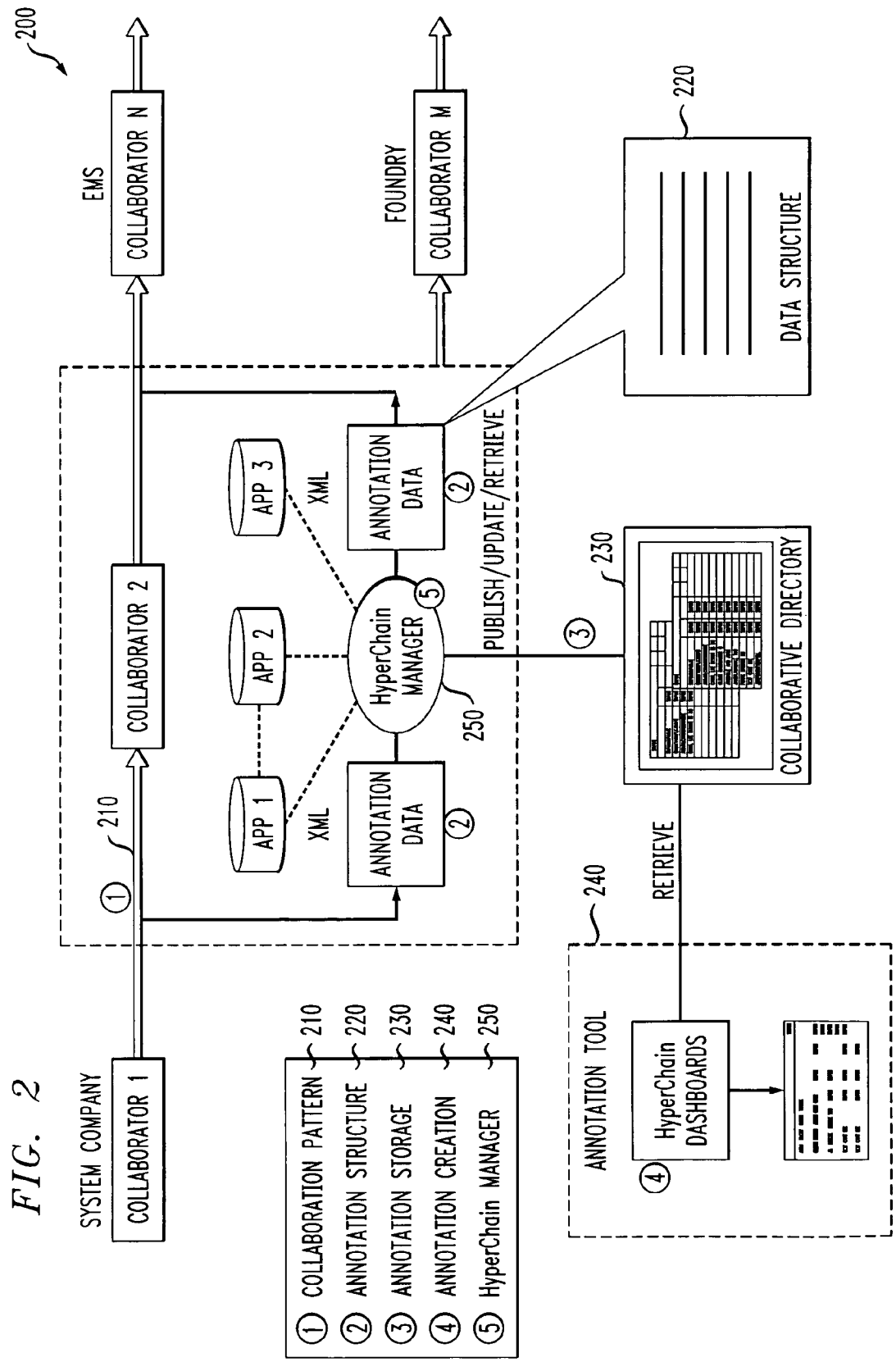
FIG. 2 is a diagram illustrating a hyperchain architecture based on an on-demand information exchange model, according to an embodiment of the present invention.

Referring now to FIG. 2, a diagram illustrates a hyperchain architecture based on an on-demand information exchange model, according to an embodiment of the present invention. Taking the above goals into consideration, such a hyperchain architecture supports flexible, distributed, secured and controlled peer-to-peer business collaboration without the need of a central hub.

As shown in FIG. 2, hyperchain architecture 200 comprises the following main components:

(1) Collaboration pattern 210: This component represents iterative actions that occur amongst the enterprises that collaborate on certain business processes;

(2) Schema-less annotation structure 220: This component represents the data format of the annotations;

(3) Annotation storage 230: This component stores annotation data for visibility control, information delivery and management;

(4) Annotation creation 240: Graphical user interface (GUI) based mechanisms to capture, create and automate the annotations; and (5) Hyperchain manager 250: This component creates and manages annotations.

It is to be understood that it is the delivery policy that describes how the on-demand contents are to be delivered. While the invention is not limited to any particular delivery policy/mechanism, four types of delivery mechanisms that may be used are described:

(1) Scheduled content delivery: On a predetermined, periodical schedule, the information content can be delivered to the recipients;

(2) On-demand content delivery: Ad-hoc, based on user's request, e.g., clicking on the hyperchain links that are provided with the annotation data and downloading the data as well as triggering a file transfer service to move one or more files from one place to another place;

(3) Access control-based content delivery: Delivering content depending upon the role and authorization of a recipient; and (4) Push-based content delivery: Sending annotation data along with attachments (in general, this model is suitable for small size file transfer).

A basic principle of the information exchange model of the invention is to send schema-less hyperchain annotation data first, then for the recipients to follow the hyperchains to fetch the detailed information, such as design files, design specifications, BOM files, based on the roles of the recipient (on-demand file transfer) through self-retrieving or agent-based file transfer services. In the meantime, the model supports tractable information associated with design files, design process and BOM.

As referred to in FIG. 2, a "collaborator (1, 2, ... M, N, ... )" is a business entity that participates in the business collaboration process with one or more external business entities. "App" (1, 2, 3, ... ) denotes the backend applications that the hyperchain manager integrates with the existing business process through an action manager component (described below). The "collaborative directory" stores the resources of the business collaboration, such as projects, tasks, users, organizations, documents, as well as annotations/meta data that is managed by the hyperchain manager. The "hyperchain dashboard" is a graphical user interface (GUI) providing management and monitoring functions through which people interact with the collaboration resources stored in the collaborative directory.

The sections that follow describe in detail main components of a hyperchain architecture according to the present invention.

I. On-Demand Business Collaboration Ontology

An ontology or commonly shared knowledge defines the business semantics to annotate information to be exchanged. An ontology also provides the collaboration foundation. Without such shared common knowledge, participants will not be able to decipher the exchanged information. Existing collaboration solutions are usually based on fixed knowledge pre-configured at each collaborator side, which reduces the collaboration flexibility and extensibility.

The business collaboration ontology is based on a basic ontology across multiple industries. In accordance with the invention, all collaborators use the basic ontology to exchange business information. The business collaboration ontology uses a Resource Description Framework (RDF) model for specification purposes. Annotation is one part of the ontology. For example, we define RDF resources such as "Site," "Organization," "Project," "Task," "Requirement," "Transaction," "Documents," "Annotation," etc. in an RDF schema. The RDF schema serves as the basic ontology definition that all collaborators need to understand.

We illustratively propose basic resources for generic business collaboration and some extensions for engineering design collaboration. The business collaboration ontology is extensible for additional annotations. Collaborators can define their own ontology and add additional annotations into the basic ontology. Collectively, the basic and extended ontologies become one entire ontology that are used to create resources and models. Collaboration ontology provides a flexible and uniform annotation representation for information exchange of various non-structured data without requiring pre-defined schemas. In addition, with annotated status and access control as part of the collaboration primitive, processes as well as documents exchanged can be tracked, monitored and controlled.

An RDF-based business collaboration ontology treats all newly added entities as resources. Thus, the same mechanism used to handle existing resources may be used to handle newly added resources. The extensive and flexible features of the business collaboration ontology allow definition of any annotations without consideration about the schema of the annotation data. Thus, as mentioned above, hyperchain annotation data that conforms to the business collaboration ontology is schema-less.

II. Annotation Structure

A. Basic Annotation for Business Collaboration Chain

In accordance with the invention, annotation data is used to annotate the entire or partial business collaboration across multiple organizations. Annotation data provides links to distributed information and addresses issues associated with data exchange in the collaborative environment by specifying "Content," "Structural," "Routing," "Location," "Life Time/Persistence," as well as "Availability" and "Viability" with respect to collaborative processes. Annotation data of various resources for business collaboration is created via a graphical user interface (GUI) or an application and stored in persistent storage. The annotation data can then be retrieved to annotate exchanged information at runtime.

Figure 3:
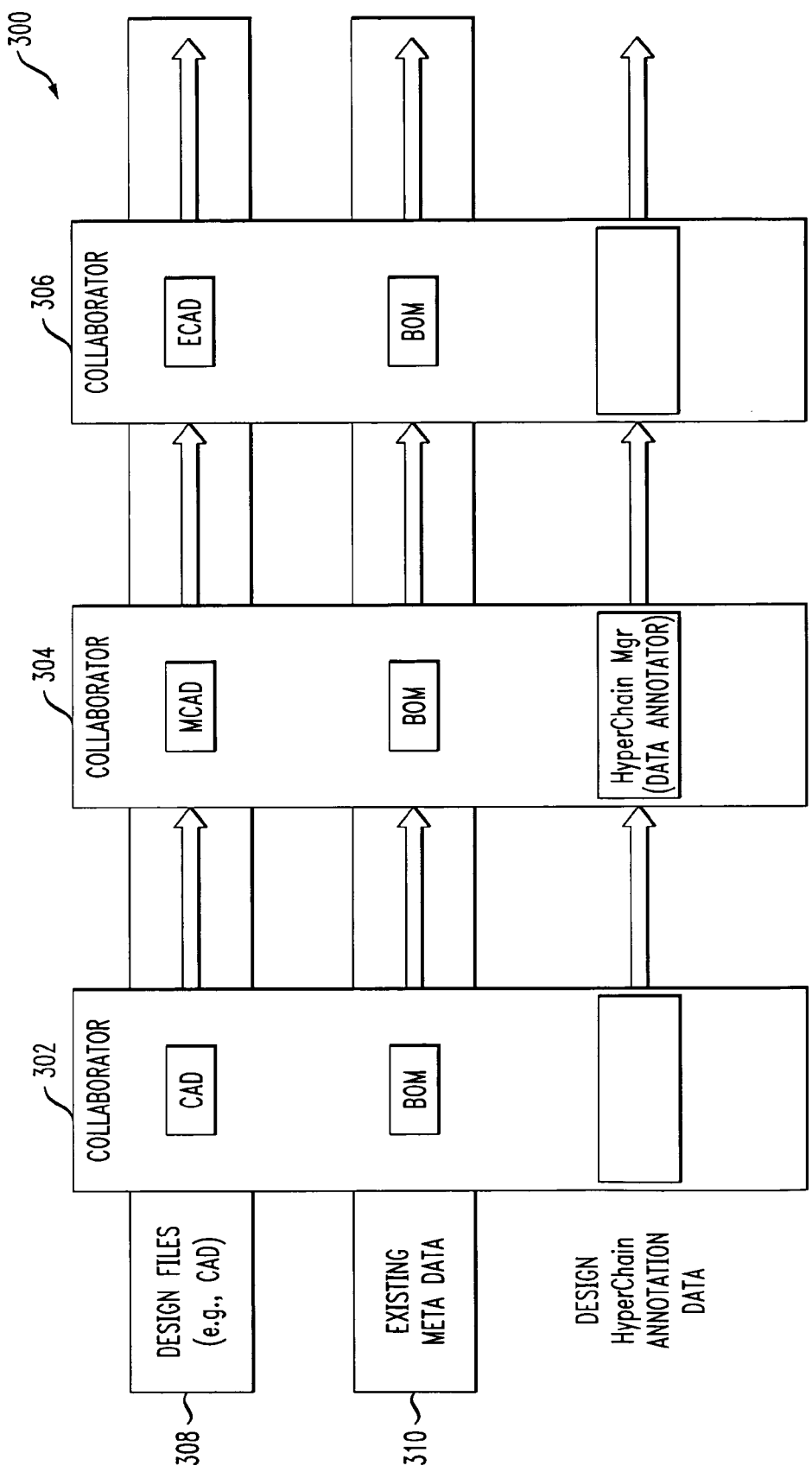
FIG. 3 is a diagram illustrating an example of a design hyperchain, according to an embodiment of the present invention.

Referring now to FIG. 3, a diagram illustrates an example of a design hyperchain, according to an embodiment of the present invention. More particularly, as shown in FIG. 3, the design hyperchain 300 illustrates annotation data which is related to, and parallel with, the upstream and downstream data.

There are three collaborators 302, 304, 306 shown in hyperchain 300. Each collaborator adds additional annotations/meta data to describe the design files or CAD (Computer-Aided Design) files 308 that are being transmitting to the subsequent collaborators. In a design collaboration scenario, usually we use design files (e.g., CAD files) and the meta data 310 for the design files to capture the basic information in a local design environment. The design hyperchain annotation data captures the extra information about the specific design files, the existing meta data, the relationship between them, as well as the connection with the whole design chain in a distributed environment.

To effectively annotate data for extended business collaboration, a Collaborative eXchange Protocol (CxP) is used. CxP uses a hierarchical, top-down approach for the annotation data. For example, in the engineering design collaboration scenario, based on the design process model, annotation data is divided into hierarchical representations, e.g., starting with annotations for design collaboration processes, followed by annotations for design activities specific to CxP, and, then, annotations for design tools used by the business entities involved in the engineering design collaboration scenario.

In the design collaboration scenario, the hierarchical annotations are employed as follows. Business process level annotation serves as an overall message for a lower level Design Collaboration Primitive. It instructs the recipient to take some actions in response to the annotation data.

For example, when design partner A wants to send a Request for design (RFD) to design partner B, he or she sends out a business process annotation message with a tag indicating it is for an RFD. Upon receiving the annotation message, partner B takes corresponding actions based on the information received from the business process annotation. The actions may be to use the design activity annotation link of the design file to retrieve more information about design requirements, or to use the design activity annotation link of the design process to get more information about the design process, etc. The "process" to handle the annotation data varies, based on the key information (e.g., action links that point to a file including a set of actions and the corresponding constraints and policies) in the annotation. Therefore, for each primitive, there are one or more interactions between the collaborators, e.g., one business process annotation message sent first, followed by different-level information requests and/or responses, organized in a sequence.

After receiving the business process annotation, partners can view the annotation and merge it with their own annotation storage. If a partner wants to know more about one of the annotated resources, he can get the annotation links, e.g., design file annotation link, and request for more information. The sender will generate annotation for the design file and send it back to the partner. The annotation for design files and tool annotations serve as the data holder for design collaboration. They instruct the recipient to take actions using some "data" in a certain way. The partner can determine whether or not to retrieve the actual design file based on the annotation.

The difference between design activity annotation and tool annotation is that design activity annotation data is specific to an extended business collaboration infrastructure and common for all design activities; tool annotation data is specific to various design tools, which is transparent to the extended business collaboration infrastructure.

Figure 4:
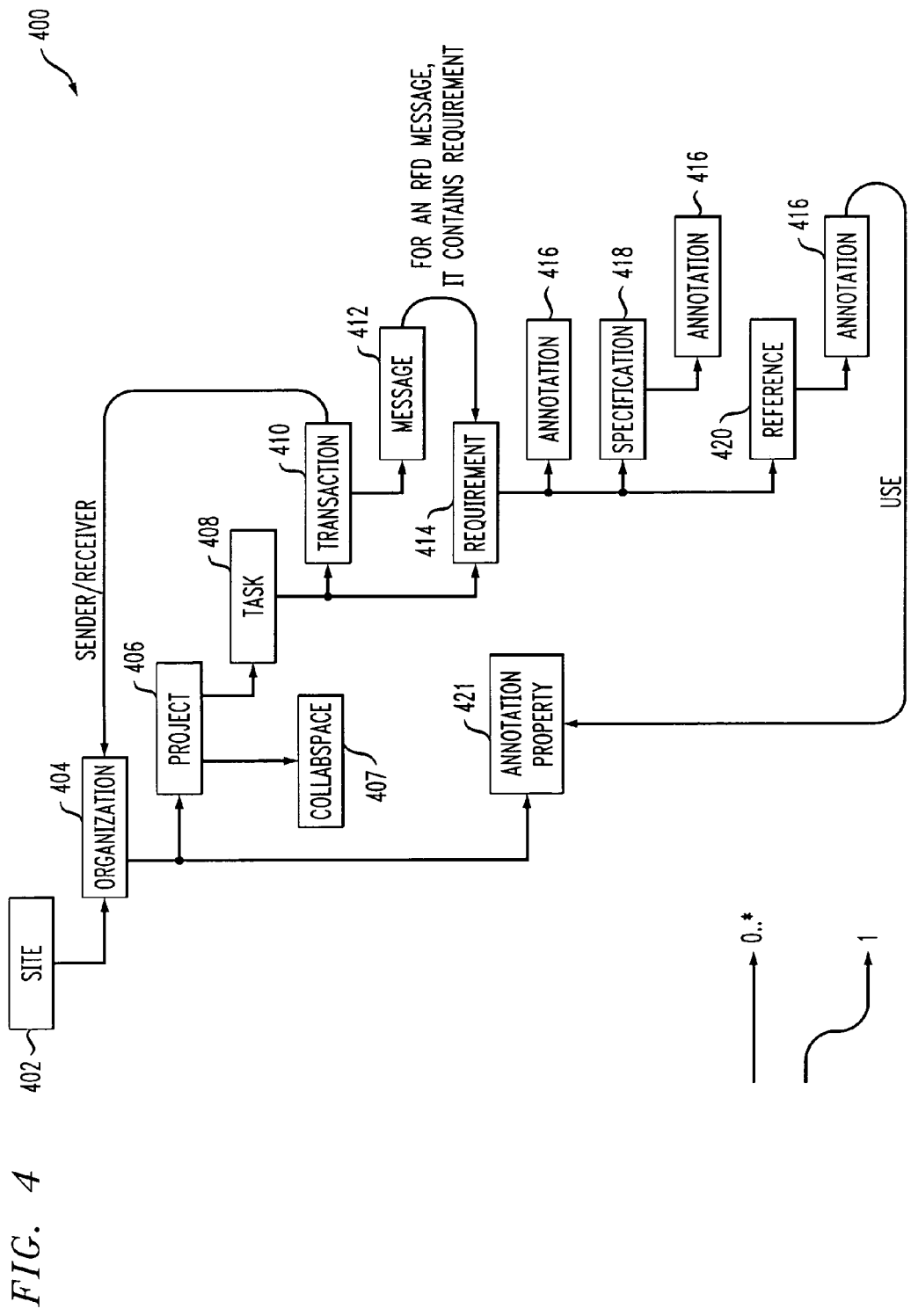
FIG. 4 is a diagram illustrating a hierarchical annotation structure, according to an embodiment of the present invention.

Referring now to FIG. 4, a diagram illustrates a hierarchical annotation structure, according to an embodiment of the present invention. More particularly, FIG. 4 describes a hierarchical annotation structure 400 of entity classes defined for a hyperchain manager.

As shown, root class (402) is the Site, which can be associated with zero or more Organization classes (404), representing businesses entities. Each Organization class can be associated with zero or more Project (406) classes, each of which in turn can be associated with zero or more Task (408) classes, as well as zero or more CollabSpaces (407). Each Task class can be associated with zero or more Transaction (410) classes, which in turn can be associated with zero or more (CxP) Message (412) classes. In addition, each Task class can be associated with zero or more Requirement (414) classes, representing requirements to be sent to the partners. Each Requirement class can be associated with zero or more Annotation (416, which may include meta data to describe the requirement), Specification (418), and Reference (420) classes.

Annotation Property (421) is the Java class that the actual annotations are created from, e.g., filename, authorname, price, etc. That is why the relationship indicates "use." Further, "Collabspace" refers to the agent or broker that conducts a human collaboration process, which is part of the extended business collaboration process. The example human collaboration process may be launching a chat program, creating a discussion thread in a discussion forum, and so forth. "0 . . . *" means that the association relationship is 1 to 0 or more, i.e., source class can be associated with zero or more instances of the target type where the straight arrow (→) is pointing to. In the example, Site can be associated with zero or more Organization classes (404), representing businesses entities. "1" refers to the association relationship being one to one.

B. Annotation for Information Exchange Flow

Figure 5:
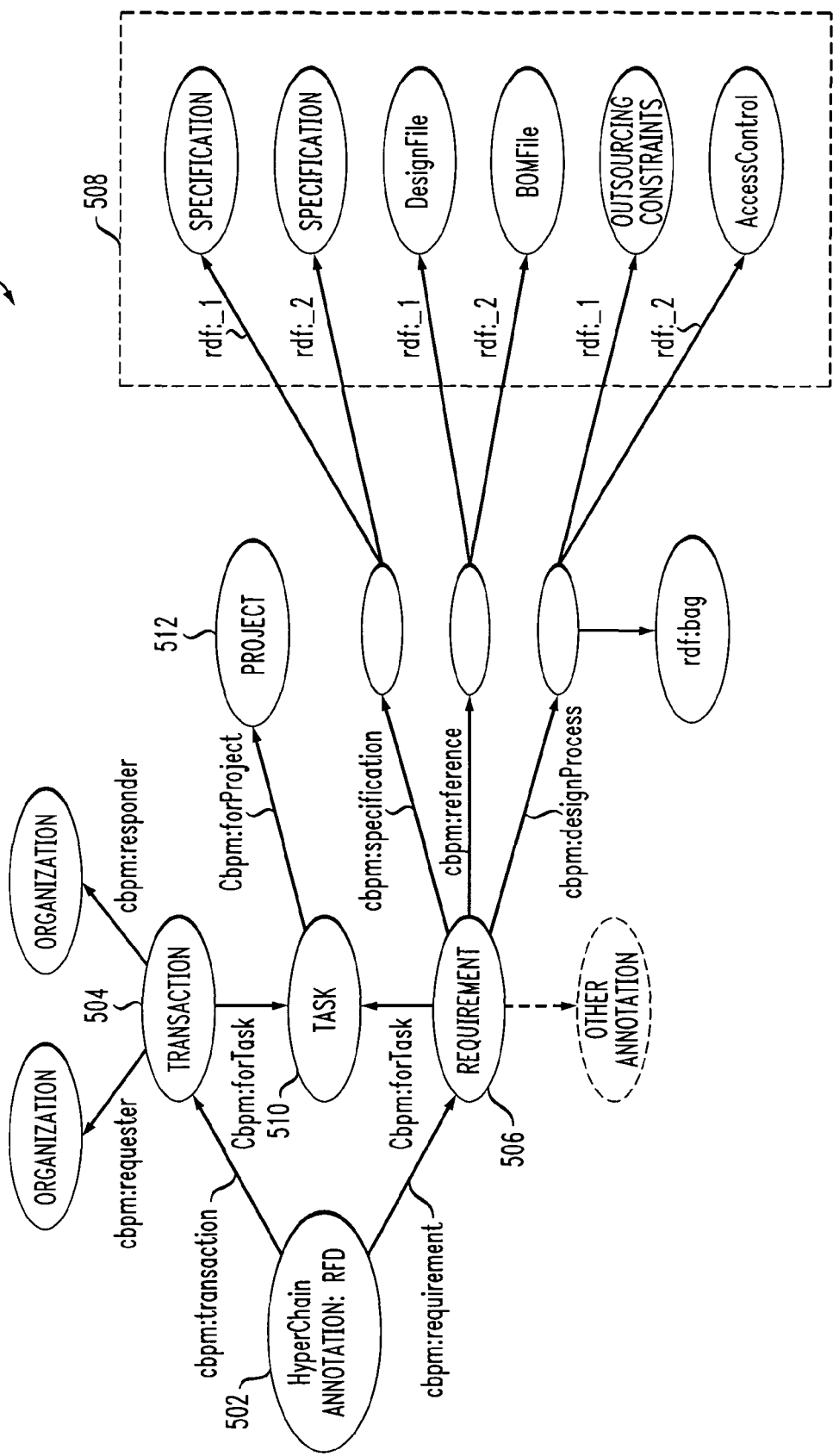
FIG. 5 is a diagram illustrating a hyperchain annotation data graph for a request for design example, according to an embodiment of the present invention.

Referring now to FIG. 5, a diagram illustrates a hyperchain annotation data graph 500 for a request for design example, according to an embodiment of the present invention. More particularly, as shown in FIG. 5, the design collaboration diagram using the RDF model (or RDF graph) illustrates the annotation data model for a Request for Design (RFD) message interchange protocol and defines several properties for information exchange.

Graph 500 shows a sample business process annotation data instance for an RFD message of the entire design chain. Starting from the leftmost node, RFD Message 502 is the root, which points to a "transaction" (504) resource defining the exchange context of the messages, RFDTransaction, the requester, PDT, and the responder, MyComputerCorp. RFD Message also points to the requirement (506) container, which groups the several annotations or metadata: design specification, reference and the designProcess, each containing links to the actual fields 508, e.g., Specification document, DesignFile, BOM File, etc. In addition, the "transaction" resource and the "requirement" resource both point to the "task" (510) resource, which in turn points to the "project" (512) resource, both resources defining which project and task the RFD message is bound to.

Based on annotation data graph 500, an Extensible Markup Language (XML) file or data stream defines an RDF instance to capture the annotation information associated with the Request for Design (RFD) protocol, such as design files, design process, as well as access control information. Note that the XML data stream can be stored in a relational database.

The following example shows a sample business process annotation data instance for an RFD message of the entire design chain. The "transaction" resource defines the exchange context of the messages, RFDTransaction, the requester, PDT, and the responder, MyComputerCorp. The "Task", T61MotherBoardDesign, and "Project", T61BoardDesign, resources define which project and task the messages are bound to. Several containers are defined to group the following annotations or metadata: Design specification annotation, T61Specification.pdf, Design file annotation, T21MotherBoard DesignFile.cat, BOM file annotation, T21BOMFile.bom, Design process annotation, outsourcingConstraint, and other related annotations, such as access control. The exemplary annotation data instance is as follows.

```
<rdf:RDF
<cbpm:RFD rdf:ID="007">
    <cbpm:transaction>
    <cbpm:Transaction
rdf:about= »http://www.pdt.com/dc/directory/transaction#007001 »>
        <rdf:type>&cbpm;RFDTransaction</rdf:type>
        <cbpm:requester
rdf:resource="http://www.pdt.com/dc/directory/Organization#PDT"/>
        <cbpm:responder
rdf:resource="http://www.pdt.com/dc/directory/
Organization#MyComputerCorp"/>
        <!--anything about the Transaction-->
    </cbpm:Transaction>
    </cbpm:transaction>
    <cbpm:task>s
    <cbpm:Task
rdf:about="http://www.pdt.com/dc/directory/
task#T61MotherBoardDesign">
        <!--anything about the task-->
        <cbpm:forProject>
        <cbpm:Project
rdf:about="http://www.pdt.com/dc/directory/project#T61BoardDesign">
        <!--anything about the project-->
        </cbpm:Project>
        </cbpm:forProject>
    </cbpm:Task>
    </cbpm:task>
    <cbpm:requirement>
    <cbpm:Requirement
rdf:about="http://www.pdt.com/dc/directory/requirement#00d034334">
        <!--anything about the requirement-->
        <cbpm:specification>
        <rdf:Bag>
        <rdf:li>
        <cbpm:Specification
rdf:about="http://www.pdt.com/pdf/T61Specification.pdf"/>
        </rdf:li>
        </rdf:Bag>
        </cbpm:specification> <cbpm:reference>
        <rdf:Bag>
        <rdf:li>
        <cbpm:DesignFile
rdf:about="http://www.pdt.com/pdf/T21MotherBoardDesignFile.cat"/>
        </rdf:li>
        <rdf:li>
        <cbpm:BOMFile
rdf:about="http://www.pdt.com/pdf/T21BOMFile.bom"/>
        </rdf:li>
        </rdf:Bag>
        </cbpm:reference>
        <cbpm:designProcess>
        <rdf:Bag>
        <rdf:li>
        <cbpm:OutsourcingConstaints
rdf:about="http://www.pdt.com/outsourcingConstraint"/>
        </rdf:li>
        <rdf:li>
        <cbpm:AccessControl rdf:about="http://www.pdt.com/
accessControl"/>
        </rdf:li>
        </rdf:Bag>
        </cbpm:designProcess>
    </cbpm:Requirement>
    </cbpm:requirement>
</rdf:RDF>
```

C. Design Activity Annotation

The design activity annotations mainly focus on constraints in the design collaboration process. There are several types of activity annotations, e.g., design requirements, design configurations/specifications, the design files, BOMs, design processes, etc., and each one is for a different purpose. Thus, each contains different annotation data with a different format. However, they should all follow the same design rule.

In the example below, a sample activity design file is shown. The information may include the following: design requirements, design configuration/specifications, the designed files, and tools, etc.

```
<cbpm:DesignFile rdf:about="http://www.nec.com/
AmpSubMinDconn9PosRearPanelMtg.CATPart">
<cbpm:fileName> Amp Sub Min D conn 9 Pos Front Panel Mtg.CATPart
</cbpm:fileName>
<cbpm:fileSize> 239K bytes </cbpm:fileSize>
<cbpm:lastModifiedTime>9/25/2002, 6:00PM </cbpm:lastModifiedTime>
<cbpm:lastVersionNumner> V5.1 </cbpm:lastVersionNumner>
<cbpm:location> ftp://ftp.nec.com/dc/designfile/
AmpSubMinDconn9PosRearPanelMtg.CATPart
</cbpm:location>
<cbpm:designTool> CATIA V5 </cbpm:designTool>
<cbpm:format> CATPart </cbpm:format>
<cbpm:designPartnerID> ABC </cbpm:designPartnerID>
<cbpm:designProjectID> ThinkPadT61 </cbpm:designProjectID>
<cbpm:accessControl>
    ... ...
</cbpm:accessControl>
</cbpm:Specification>
```

The following example shows a design activity annotation where several constraints are specified as well as the access control using OASIS eXtensible Access Control Markup Language (XACML) [Security Assertion Markup Language (SAML), http://xml.coverpages.org/saml.html] to express the constraints.

```
<cbpm:design-activity-annotation>
<cbpm:desc>
<cbpm:checkpointConstraints>. . .</cbpm:checkpoint constraints>
<cbpm:outsourcingConstraints>... (XACML)
</cbpm:outsourcingConstraints>
<cbpm:acl>     ... (XACML)    </cbpm:acl>
<cbpm:documentFormatConstraints>http://temporg.com/tempuri/
documentFormatContraints.htm</cbpm:document
FormatConstraints>
    </cbpm:desc>
</cbpm: design-activity-annotation>
```

D. Tool Annotation

Tool annotations are for design tools, and are platform-dependent. Some examples of such tool annotations pertaining to a BOM file may be processing platform, designStatus (on-going or redesign), review status, modification history, password to download, etc. The following is an exemplary tool annotation data instance.

```
<cbpm:design-process-low-level-annotation>
<cbpm:bomDesc>
<cbpm:fileProperty>
    <cbpm:filename>CDRom</cbpm:filename>
    <cbpm:fileSize>1020K</cbpm:fileSize>
```

-continued

```
    <cbpm:creationTool>MSEXCEL</cbpm:creationTool>
    <cbpm:documentId>ThinkPad-Bom-010</cbpm:documentId>
    </cbpm:fileProperty>
</cbpm:processingPlatform>
<cbpm:DevelopmentPlatformID>UNIX</cbpm:DevelopmentPlatformID/>
<cbpm:ParentDesignToolID>CATIAPP</cbpm:ParentDesignToolID/>
<cbpm:AccessibleParty>http://temporg.com/tempuri/acl/
ThinkPad-Bom-010AccessList</cbpm:Accessible
Party>
    </cbpm:processingPlatform>
</cbpm:bomDesc>
    </cbpm:tool-annotation>
```

III. Annotation Storage

The design collaboration ontology is defined in RDF schema format, and is stored in RDF format. Annotation is one part of the ontology.

There are diverse requirements for annotation in design collaboration, and new requirements emerge endlessly. In addition to the pre-defined annotations for electronic business collaboration, users can define custom annotations. The following is a sample of storage of an annotation definition.

```
<rdf:RDF
    xmlns:daml='http://www.daml.org/2001/03/daml+oil#'
    xmlns:rdf='http://www.w3.org/1999/02/22-rdf-syntax-ns#'
    xmlns:rdfs='http://www.w3.org/2000/01/rdf-schema#'>
    <daml:DatatypeProperty rdf:about='http://www.ibm.com/ibm/
    pdt#fileName'
        rdfs:label='fileName'>
        <rdfs:comment>The name of a file, huh?</rdfs:comment>
        <rdfs:domain rdf:resource='http://www.w3.org/2000/01/
        rdf-schema#Resource'/>
        <rdfs:range rdf:resource='http://www.w3.org/2000/10/
        XMLSchema#string'/>
        <rdfs:isDefinedBy rdf:resource='urn:Organization:PDT@PDT'/>
    </daml:DatatypeProperty>
    <daml:DatatypeProperty rdf:about='http://www.ibm.com/ibm/
    pdt#fileSize'
        rdfs:label='fileSize'>
        <rdfs:comment>The size of a file</rdfs:comment>
        <rdfs:domain rdf:resource='http://www.ibm.com/cbpm#Document'/>
        <rdfs:range rdf:resource='http://www.w3.org/2000/10/
        XMLSchema#string'/>
        <rdfs:isDefinedBy rdf:resource='urn:Organization:PDT@PDT'/>
    </daml:DatatypeProperty>
    <daml:DatatypeProperty rdf:about='http://www.ibm.com/ibm/
    pdt#format'
        rdfs:label='format'>
        <rdfs:comment>The format of a file, huh?</rdfs:comment>
        <rdfs:domain rdf:resource='http://www.ibm.com/cbpm#Document'/>
        <rdfs:range rdf:resource='http://www.w3.org/2000/10/
        XMLSchema#string'/>
        <rdfs:isDefinedBy rdf:resource='urn:Organization:PDT@PDT'/>
    </daml:DatatypeProperty>
</rdf:RDF>
```

These annotation definitions are applied to various elements during the information exchanges in design collaboration processes. The following is a storage (in RDF representation) of the annotated information during the RFD primitive for a design project.

```
<rdf:RDF
    xmlns:RDFNsId1='http://www.ibm.com/ibm/pdt#'
    xmlns:rdf='http://www.w3.org/1999/02/22-rdf-syntax-ns#'
    xmlns:RDFNsId2='http://www.ibm.com/cbpm#'>
```

-continued

```
<RDFNsId2:RFD
rdf:about='urn:RFD:task1_RFD1@task1_RFD1@CPUDesign@SuperComputer@PDT@PDT'
   RDFNsId2:identifier='task1_RFD1'
   RDFNsId2:description=''
   RDFNsId2:status='Received'>
   <RDFNsId2:creationTime>Dec 10, 2002 8:12:21 PM</RDFNsId2:creationTime>
   <RDFNsId2:transaction>
    <RDFNsId2:RFDTransaction
rdf:about='urn:Transaction:task1_RFD1@CPUDesign@SuperComputer@PDT@PDT'
      RDFNsId2:status='Created'
      RDFNsId2:identifier='task1_RFD1'>
     <RDFNsId2:requester>
      <RDFNsId2:Organization rdf:about='urn:Organization:PDT@PDT'
        RDFNsId2:identifier='PDT'
        RDFNsId2:schemaExtensionURL='http://www.ibm.com/ibm/pdt'>
      </RDFNsId2:Organization>
     </RDFNsId2:requester>
     <RDFNsId2:creationTime>Dec 10, 2002 8:12:21 PM</RDFNsId2:creationTime>
     <RDFNsId2:forTask>
      <RDFNsId2:OursourcingTask
rdf:about='urn:Task:CPUDesign@SuperComputer@PDT@PDT'
       RDFNsId2:identifier='CPUDesign'
       RDFNsId2:status='RFDReceived'>
        <RDFNsId2:performer>
         <RDFNsId2:Organization rdf:about='urn:Organization:ABC@ABC'
          RDFNsId2:schemaExtensionURL='http://www.ibm.com/ibm/nec'
          RDFNsId2:identifier='MYASIC'>
         </RDFNsId2:Organization>
        </RDFNsId2:performer>
        <RDFNsId2:description>I am designing the fastest CPU in the world</RDFNsId2:description>
        <RDFNsId2:name>Designing a CPU</RDFNsId2:name>
        <RDFNsId2:forProject>
         <RDFNsId2:Project rdf:about='urn:Project:SuperComputer@PDT@PDT'
          RDFNsId2:status='Created'
          RDFNsId2:identifier='SuperComputer'>
         </RDFNsId2:Project>
        </RDFNsId2:forProject>
        <RDFNsId2:creationTime>Dec 10, 2002 8:12:21 PM</RDFNsId2:creationTime>
       </RDFNsId2:OursourcingTask>
      </RDFNsId2:forTask>
      <RDFNsId2:responder rdf:resource='urn:Organization: MYASIC @ MYASIC />
     </RDFNsId2:RFDTransaction>
    </RDFNsId2:transaction>
    <RDFNsId2:requirement>
     <RDFNsId2:DesignRequirement
rdf:about='urn:DesignRequirement:req1@CPUDesign@SuperComputer@PDT@PDT'
      RDFNsId2:description='desc'
      RDFNsId1:TFTSize='14.1'
      RDFNsId2:identifier='req1'
      RDFNsId1:cpuFrequency='2.5G'>
      <RDFNsId2:name>requirement 1</RDFNsId2:name>
      <RDFNsId2:reference>
       <rdf:Bag>
        <rdf:li>
         <RDFNsId2:DesignFile
rdf:about='urn:Document:Ref1@req1@CPUDesign@SuperComputer@PDT@PDT'
          RDFNsId1:fileAuthor='robert'
          RDFNsId1:fileName='cpurequirementRef1.doc'
          RDFNsId2:identifier='Ref1'>
          <RDFNsId2:name>ref 1</RDFNsId2:name>
          <RDFNsId2:description>This is ref 1</RDFNsId2:description>
         </RDFNsId2:DesignFile>
        </rdf:li>
       </rdf:Bag>
      </RDFNsId2:reference>
      <RDFNsId2:specification>
       <rdf:Bag>
        <rdf:li>
         <RDFNsId2:Specification
rdf:about='urn:Document:Spec1@req1@CPUDesign@SuperComputer@PDT@PDT'
          RDFNsId1:fileAuthor='robert'
          RDFNsId2:identifier='Spec1'
          RDFNsId1:fileName='cpurequirement.doc'>
          <RDFNsId2:description>This is doc 1</RDFNsId2:description>
          <RDFNsId2:name>doc 1</RDFNsId2:name>
         </RDFNsId2:Specification>
        </rdf:li>
       </rdf:Bag>
      </RDFNsId2:specification>
```

-continued

```
    <RDFNsId2:forTask
rdf:resource='urn:Task:CPUDesign@SuperComputer@PDT@PDT'/>
      </RDFNsId2:DesignRequirement>
    </RDFNsId2:requirement>
  </RDFNsId2:RFD>
  <RDFNsId2:ReceiptAck
rdf:about='urn:ReceiptAck:task1_RFD1ReceiptAck@task1_RFD1@CPUDesign@SuperComputer@PDT
@PDT'
    RDFNsId2:identifier='task1_RFD1ReceiptAck'
    RDFNsId2:status='Created'>
    <RDFNsId2:transaction
rdf:resource='urn:Transaction:task1_RFD1@CPUDesign@SuperComputer@PDT@PDT'/>
    <RDFNsId2:creationTime>Dec 10, 2002 8:04:02 PM</RDFNsId2:creationTime>
  </RDFNsId2:ReceiptAck>
  <RDFNsId2:Individual rdf:about='urn:Individual:Mike@PDT@PDT'
    RDFNsId2:identifier= Mike>
    <RDFNsId2:memberOf rdf:resource='urn:Organization:PDT@PDT'/>
    <RDFNsId2:description>This is an user.</RDFNsId2:description>
    <RDFNsId2:name>Mike Josh</RDFNsId2:name>
  </RDFNsId2:Individual>
</rdf:RDF>
```

The annotation can be stored in a collaborative directory (230 in FIG. 2), which can be deployed on each enterprise site. Since the data with embedded status information (e.g., about the project, tasks, exchanged documents, etc.) is stored in multiple collaborative directories, the information from these distributed collaborative directories can be aggregated based on an access control policy carried in the annotation data.

Another embodiment of the collaborative directory comprises the collaborative directory serving as a hub. Such a hub manages collaborative resources of multiple organizations that use the hub as a central place to perform business collaboration.

IV. Annotation Creation

Annotation creation is a major function of the On-demand Information Exchange Model. It may be performed in accordance with annotation tools 240 in FIG. 2. As mentioned above, all the annotation data of various resources used in business collaboration are stored in annotation storage such as a plain text file or a relational database. The annotation creation process may operate on the storage to create annotations. In one illustrative embodiment, creation of annotation includes the following steps:

(1) Collect information by use of extended business collaboration portal. The information includes the description of various resources such as partners, projects, tasks, specification annotations, reference design file annotations, other related annotations and so on.

(2) Store all the collected information into the annotation storage.

(3) Extract required data from the storage to organize the annotation message to be exchanged.

Let us take the RFD message creation as an example to illustrate the process.

First, the user creates a new task as an outsourcing task or internal task, for example, as is shown in FIG. 10.

Then, the user may specify design requirements for the design task. The requirements may include specifications, reference design files, design process constraints and so on. FIG. 11 illustrates the creation of a Request for Design (RFD) message, including design requirement annotations/meta data. FIG. 12 illustrates creation of Specification documents.

After the information is collected and stored in the annotation storage, the annotation creation process starts. The annotation creation module (240 in FIG. 2) extracts required data from the storage (230 in FIG. 2) and forms the RFD annotation message based on an RFD message data model. The generated RFD message will be sent to design partners.

After receiving the RFD message, partners can view the annotation and merge it with their own annotation storage. If a partner wants to know more about one of the annotated resources, he can get the annotation link (such as design file annotation link) and request more information. The sender will generate an annotation for the design file and send it back to the partner. The partner can determine whether or not to retrieve the actual design file based on the annotation. Thus, on-demand information exchange is performed.

V. Collaboration Pattern

CxP uses Resource Definition Framework (RDF) to annotate design collaboration processes by defining industry specific ontology, allowing peer-to-peer interaction between collaborative processes. CxP is a typical collaboration pattern referenced as 210 in FIG. 2. CxP comprises the messages to be exchanged between two parties or among multiple parties, some predefined message exchange sequences, and a business goal-oriented protocol composed by some predefined message exchange sequences. RDF is a general-purpose language and common framework for representing metadata (or properties) of web resources and it is defined in XML syntax. CxP builds on top of a set of standard protocols and adds the features needed for extended business collaboration processes.

Figure 6:
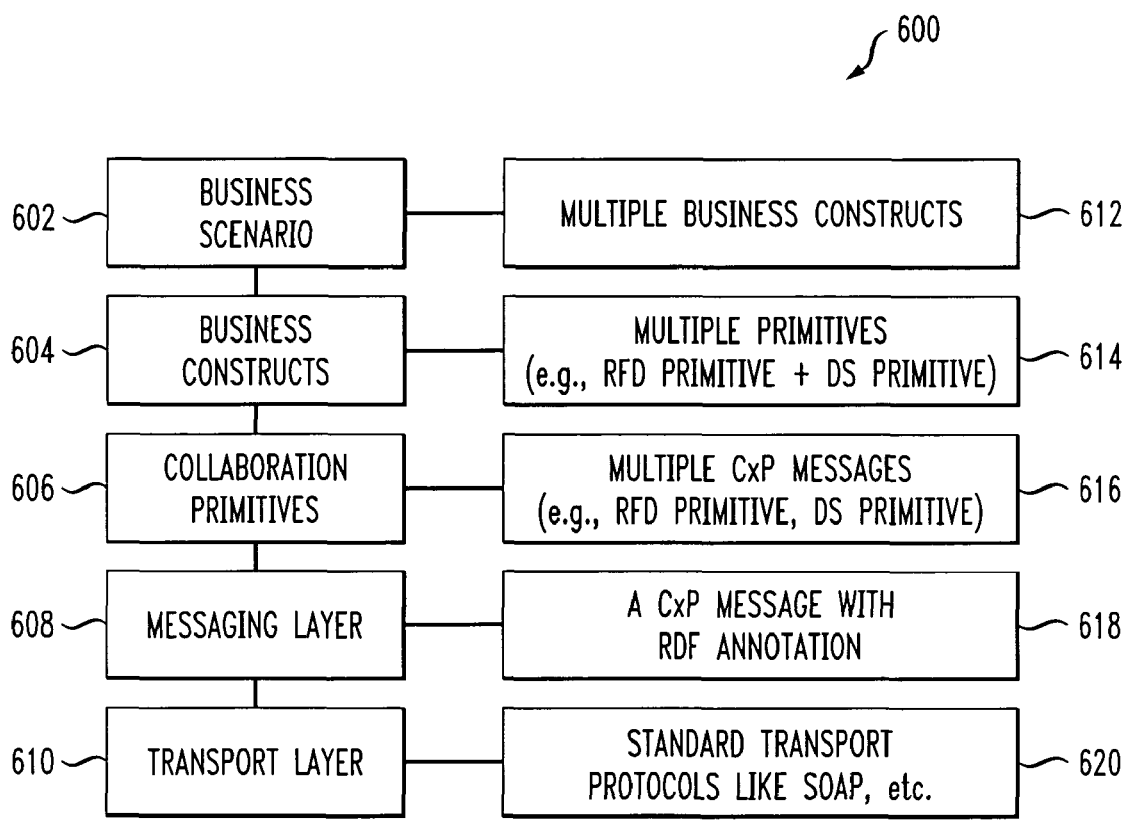
FIG. 6 is a diagram illustrating an example of collaboration primitives and business constructs, according to an embodiment of the present invention.

The overall protocol architecture can be described in the context of FIG. 6. More particularly, FIG. 6 is a diagram illustrating an example of collaboration primitives and business constructs, according to an embodiment of the present invention. As shown, in protocol architecture 600, the following elements are defined: business scenario 602, business constructs 604, collaboration primitives 606, messaging layer 608 and transport layer 610. The corresponding descriptions on each layer are multiple business constructs 612, multiple primitives 614 (e.g., request for design (RFD) primitive and design submission (DS) primitive), multiple CxP messages 616 (e.g., RFD primitive, DS primitive), CxP message with RDF annotation 618, and standard transport protocols 620.

In messaging layer 608, RDF is used to represent business collaboration annotation which is called hyperchain annotation. On top of that, a set of primitives are defined as collaboration primitives 606 to help the communication and collaboration between the parties.

A business construct 604 is a basic unit of message exchange sequences which serve a single business goal. For example, an RFD business construct is used when a request for design is initialized, e.g., a design center. Product design team (PDT), shown in FIG. 7, can send RFDs to its design partners to do motherboard designs or to do mechanical and electrical designs. Following that, an accept or reject primitive may be received from the design partners. Later, a design partner may submit its design results by DS primitive.

A business scenario 602 serves a more complex business goal like Early Design-In scenario. Each business scenario may comprise several business constructs depending on the corresponding business context.

Details of the collaboration primitive, business construct, and business scenario are described below.

Figure 7:
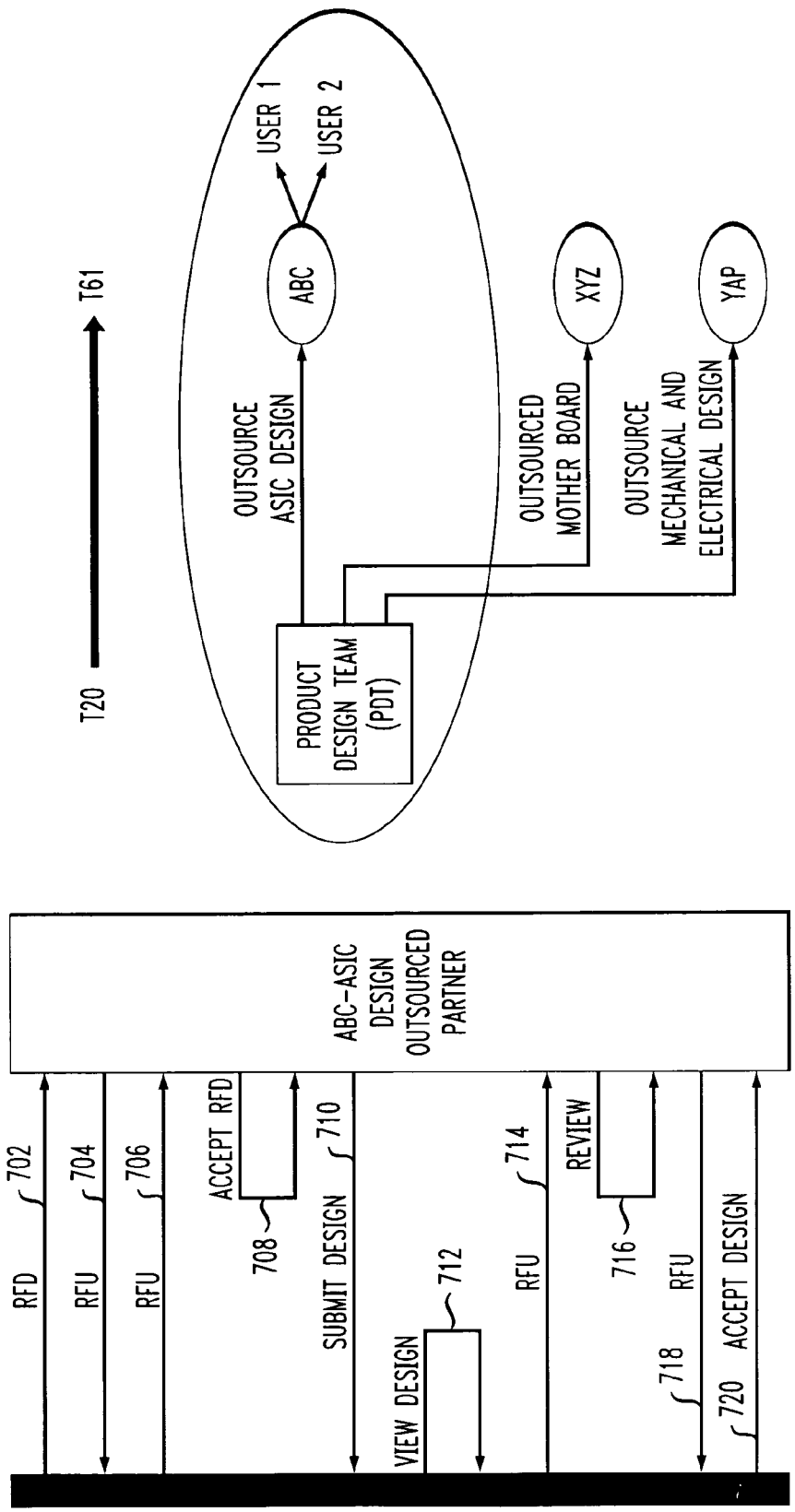
FIG. 7 is a diagram illustrating an outsourcing scenario composed by business constructs, according to an embodiment of the present invention.

Based on these protocols, collaborators can define the Design Collaboration (DC) processes as they want. The following is a ThinkPad design work process, which involves multiple collaborators and is composed of multiple protocols. FIG. 7 shows only the fragment, which is between PDT and ABC, of the whole process. The example of FIG. 7 will be explained below.

In CxP, an atomic message is defined as a rudimentary exchange of information between trading partners, e.g., an RFD message. A set of choreographed messages form a primitive. For example, RFD primitive may comprises two messages, e.g., RFDMessage and AckMessage. Furthermore, one or more primitives form a business construct. For example, RFD business construct may comprises two primitives, e.g., RFD primitive and Acceptance/Rejection primitive. Scenarios are sequences of business constructs that represent a complex interaction among business partners, such as design initialization, engineering change management, and opportunity launch. In addition, CxP primitives and business constructs are targeted for specific collaboration goals and, even though configurable, they are relatively fixed. While business scenarios can be composed in many ways and thus are quite flexible.

A design collaboration primitive is a group of message exchanges for a specific and microdesign collaboration goal. Several core design collaboration primitives are defined for CxP:

RFD (Request For Design)
Accept/Reject (Accept or Reject a request)
DS (Design Submission)
RFI (Request For Information)
IS (Information Submission)
RFU (Request For Update)
US (Update Submission)

Figure 8:
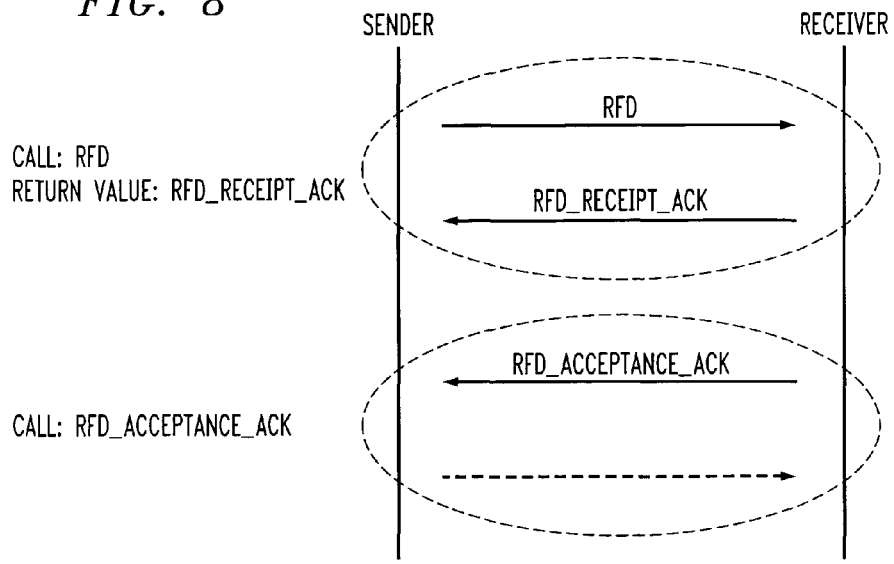
FIG. 8 is a diagram illustrating an exemplary collaboration pattern, according to an embodiment of the present invention.

Let us take RFD as an example; each collaborator uses the RFD primitive to request a partner to perform a design task. An RFD primitive comprises three messages: RFD, RFD_Receipt_Ack, and RFD_Acceptance_Ack messages. This is illustrated in FIG. 8.

RFD Message: sent by the originator, e.g., a design center, to a recipient, e.g., design partner. Contains a requirement comprising specifications, references, and annotations.

RFD_Receipt_Ack Message: sent by the recipient; a response to RFD message, indicating the RFD message has been received by the recipient.

The following is an example:

```
<RDFNsId2:RFD
rdf:about='urn:RFD:SoundCard_test1@SoundCard_test1@SoundCard@Workstation@PDT@PDT'
RDFNsId2:description=''
RDFNsId2:identifier='SoundCard_test1 '
RDFNsId2:status='Accepted'>
<RDFNsId2:requirement>
<RDFNsId2:DesignRequirement
rdf:about='urn:DesignRequirement:test1@SoundCard@Workstation@PDT@PDT'
RDFNsId1:cpuFrequency='500'
RDFNsId2:identifier='test1 '
RDFNsId2:name='test1 '
RDFNsId2:description='test1 '>
<RDFNsId2:specification>
<rdf:Bag>
<rdf:li>
<RDFNsId2:Specification rdf:about='urn:Document:test@test1@SoundCard@Workstation@PDT@PDT'
RDFNsId2:identifier='test'
RDFNsId2:name='test'
RDFNsId2:description='d:\there'/>
</rdf:li>
<rdf:li>
<RDFNsId2:Specification rdf:about='urn:Document:@test1@SoundCard@Workstation@PDT@PDT'
RDFNsId2:description=''
RDFNsId2:name=''
RDFNsId2:identifier=''/>
</rdf:li>
</rdf:Bag>
</RDFNsId2:specification>
<RDFNsId2:reference
rdf:type='http://www.w3.org/1999/02/22-rdf-syntax-ns#Bag'/>
<RDFNsId2:forTask rdf:resource='urn:Task:SoundCard@Workstation@PDT@PDT'/>
</RDFNsId2:DesignRequirement>
</RDFNsId2:requirement>
<RDFNsId2:transaction
rdf:resource='urn:Transaction:SoundCard_test1@SoundCard@Workstation@PDT@PDT'/>
<RDFNsId2:creationTime>Jan 16, 2003 5:10:17 PM</RDFNsId2:creationTime>
</RDFNsId2:RFD>
```

Each design partner may accept or reject the request after the partner received either an RFD or RFU. One example of an Accept primitive to an RFD is as follows:

```
<RDFNsId2:AcceptanceAck
rdf:about='urn:AcceptanceAck:SoundCard_
test1AcceptanceAck@SoundCard_test1@SoundCard@Workstation
@PDT@PDT'
RDFNsId2:identifier='SoundCard_test1AcceptanceAck'
RDFNsId2:ack='Accept'
RDFNsId2:status='Sent'>
<RDFNsId2:transaction
rdf:resource='urn:Transaction:SoundCard_
test1@SoundCard@Workstation@PDT@PDT'/>
<RDFNsId2:creationTime>Jan 16, 2003 5:38:38
PM</RDFNsId2:creationTime>
</RDFNsId2:AcceptanceAck>
```

A. Business Construct

A business construct comprises a group of collaboration primitives, which can be selectively configured for a business construct. Once configured, a business construct is organized in a relatively fixed fashion to achieve a single design collaboration goal. The following business constructs are based on the primitives previously discussed:

RFD business construct (RFD primitive+Accept/Reject primitive+DS primitive)
    RFU business construct (RFU primitive+US primitive)
    RFI business construct (RFI primitive+IS primitive)
    US business construct (US primitive)
    IS business construct (IS primitive)

Based on these business constructs, collaborators can define any complex business scenario as they so desire.

The business constructs are often very complicated because they often involve multiple interactive messages based on the collaboration primitives.

A standard protocol for a business process modeling language, such as Business Process Execution Language (BPEL4WS) (http://www-106.ibm.com/developerworks/webservices/library/ws-bpel/), can be used to represent CxP business constructs and business scenarios. Once represented by BPEL4WS, multiple business constructs can form a business scenario, which can be dynamically composed.

B. Example: RFD Business Construct

A RFD business construct may contain one RFD primitive, one Accept/Reject primitive, and one DS primitive. The RED microflow can be represented using BPEL4WS as follows:

```
<process name="RFDmicroflow"
    targetNamespace="urn:samples:BusinessConstructs"
    xmlns:tns="urn:samples:BusinessConstructs"
    xmlns="http://schemas.xmlsoap.org/ws/2003/03/business-process/">
<partners>
    <partner name="RFDoriginator"
        serviceLinkType="tns:RFDoriginatingSLT"
        myRole="RFDoriginating"/>
    <partner name="RFDreceiver"
        serviceLinkType="tns:RFDreceivingSLT"
        myRole="RFDreceiving"/>
    <partner name="buyer"
    serviceLinkType="tns:buyingSLT"
    MyRole="buying"/>
</partners>
<variables>
    <variable name="RFDinvoke" messageType="tns:RFDinvoke"/>
 <variable name="RFDmsg" messageType="tns:RFDmsg"/>
    <variable name="RFD_Receipt_Ack" messageType="tns:RFD_Receipt_Ack"/>
    <variable name="Accept" messageType="tns:Accept"/>
    <variable name="DSinvoke" messageType="tns:DSinvoke"/>
    <variable name="DSmsg" messageType="tns:DSmsg"/>
    <variable name="DS_Receipt_Ack" messageType="tns:DS_Receipt_Ack"/>
</variables>
<correlationSets>
    <correlationSet name="POIdentifier" properties="POIdentifier"/>
    <correlationSet name="RFDIdentifier" properties="RFDIdentifier"/>
</correlationSets>
<sequence>
 <receive partner="buyer" portType="tns:buyerPT"
            operation="purchase" variable="RFDinvoke"
            createInstance="yes" name="ReceivePurchase">
            <correlations>
                <correlation set="POIdentifier" initiate="yes"/>
            </correlations>
        </receive>
        <invoke name="invokeRFDoriginator"
            partner="RFDoriginator" portType="tns:RFDoriginatorPT"
            operation="sendRFD" inputVariable="RFDinvoke" outputVariable="RFDmsg">
        </invoke>
        <invoke name="invokeRFDreceiver"
            partner="RFDreceiver" portType="tns:RFDreceiverPT"
            operation="receiveRFD" inputVariable="RFDmsg" outputVariable="RFD_Receipt_Ack">
        </invoke>
        <invoke name="invokeRFD_Accept_Ack"
            partner="RFDreceiver" portType="tns:RFDreceiver"
            operation="sendRFD_Accept" inputVariable="RFDmsg"
    outputVariable="RFD_Accept_Ack">
```

```
        </invoke>
        <invoke name="invokeRFD_Accept_receive"
            partner="RFDoriginator" portType="tns:RFDoriginator"
            operation="receive_Accept" inputVariable="Accept">
        </invoke>
        <invoke name="invokeDS"
            partner="RFDreceiver" portType="tns:RFDreceiver"
            operation="submitDS" inputVariable="DSinvoke" outputVariable="DSmsg">
        </invoke>
        <invoke name="invokeDS_Receipt_Ack"
            partner="RFDoriginator" portType="tns:RFDoriginator"
            operation="receiveDS" inputVariable="DSmsg" output variable="DS_Receipt_Ack">
        </invoke>
    </sequence>
</process>
```

The business collaboration or design collaboration patterns can be very complicated because they often involves multiple interactive messages based on the primitive protocols. Take design outsourcing for example. In FIG. 7, the right-hand side shows a design center, Product design team, which outsources parts of the ThinkPad design to different design partners, e.g., to ABC for ASIC chip design, to XYZ for motherboard design, and to YAP for mechanical and electrical design. The left-hand side of FIG. 7 shows the design collaboration patterns between Product design team and ABC. The various messages flow between the two partners, starting from a request for design (RFD) 702, followed by requests for updates (RFUs) 704 and 706, by the acceptance of the RFD 708, by the submission of design 710, by the viewing of the design 712, by further RFUs and intermediate reviews 714, 716 and 718, finally concluded with the acceptance of design 720.

The sample design collaboration pattern shown in FIG. 7 demonstrates the flexibility and versatility of the RDF to support various data format required in collaboration message flow and document exchanges.

VI. HyperChain Manager

Figure 9A:
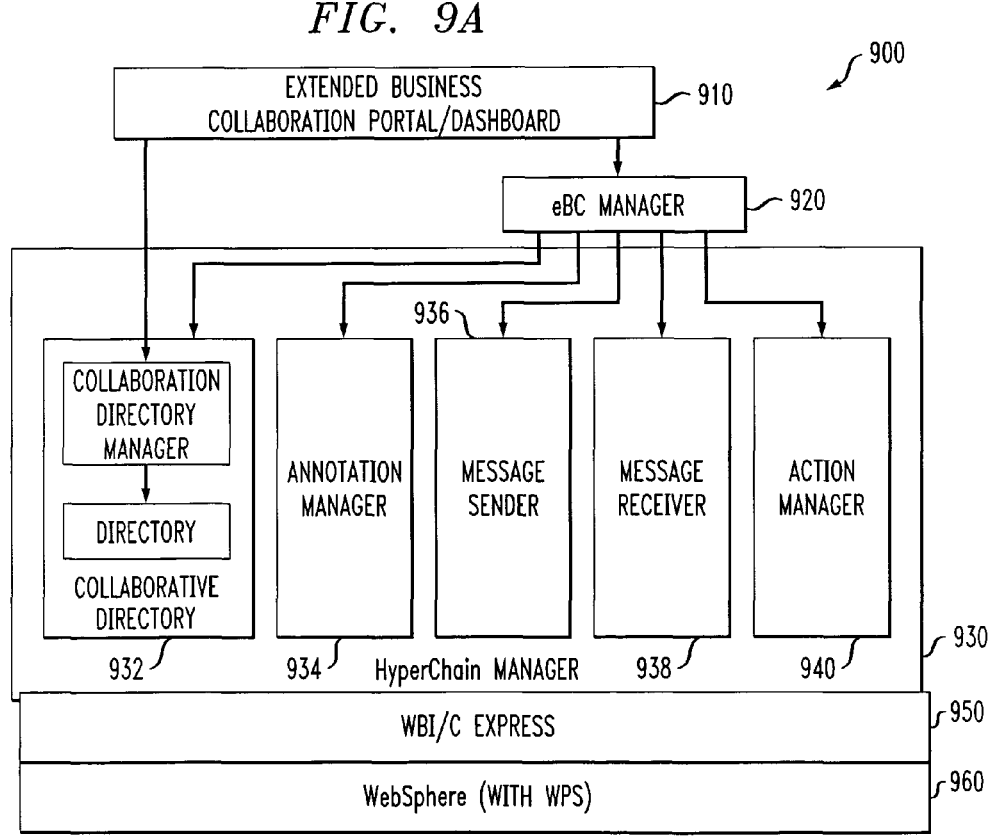
FIG. 9A is a diagram illustrating a hyperchain manager, according to an embodiment of the present invention.

Referring now to FIG. 9A, a diagram illustrates a hyperchain manager, according to an embodiment of the present invention. As shown in FIG. 9A, a hyperchain manager (250 of FIG. 2) serves as a CxP engine. The architecture 900 in FIG. 9A comprises an extended business collaboration portal/dashboard 910, an extended business collaboration (eBC) manager 920, a hyperchain manager 930, a WBI/C Express layer 950 that servers as a gateway between the hyperchain manager and the lower-level web application server such as a Websphere layer 960 that is a typical Java-based web application server for hosting business applications. Thus, the CxP engine (hyperchain manager) is on the J2EE platform with WebSphere as an example. The portal or dashboard 910 includes applications that can access the CxP engine via the application programming interface (API) layer provided by eBC manager 920.

Hyperchain manager 930 comprises a collaborative directory 932 (with manager and directory), an annotation manager 934, a message sender 936, a message receiver 938 and an action manager 940.

The collaboration directory manager component manages the resources tracked by the CxP engine, such as organizations (partners), users, projects, tasks, etc., and the resources are RDF-based. The CxP messages are sent and received by the message sender and receiver modules and they are Simple Object Access Protocol (SOAP) messages or other protocol messages such as Message Queuing (MQ) messages.

The annotation manager processes the meta data or annotations created for the documents exchanged via CxP messages. Examples of annotations are file name, file type, version, author name, etc. In addition, annotations can also be used to specify "actions" to be performed on the documents. Examples of such actions may be "review" document, perform "RFTP" (reliable file transfer) and send actions to legacy applications like Enterprise Resource Planning (ERP) and PDM, etc.

The annotations in the received messages are forwarded to the action manager, which is an integration layer to back-end legacy applications as well as components like RFTP. The action manager invokes the proper actions on the documents.

Figure 9B:
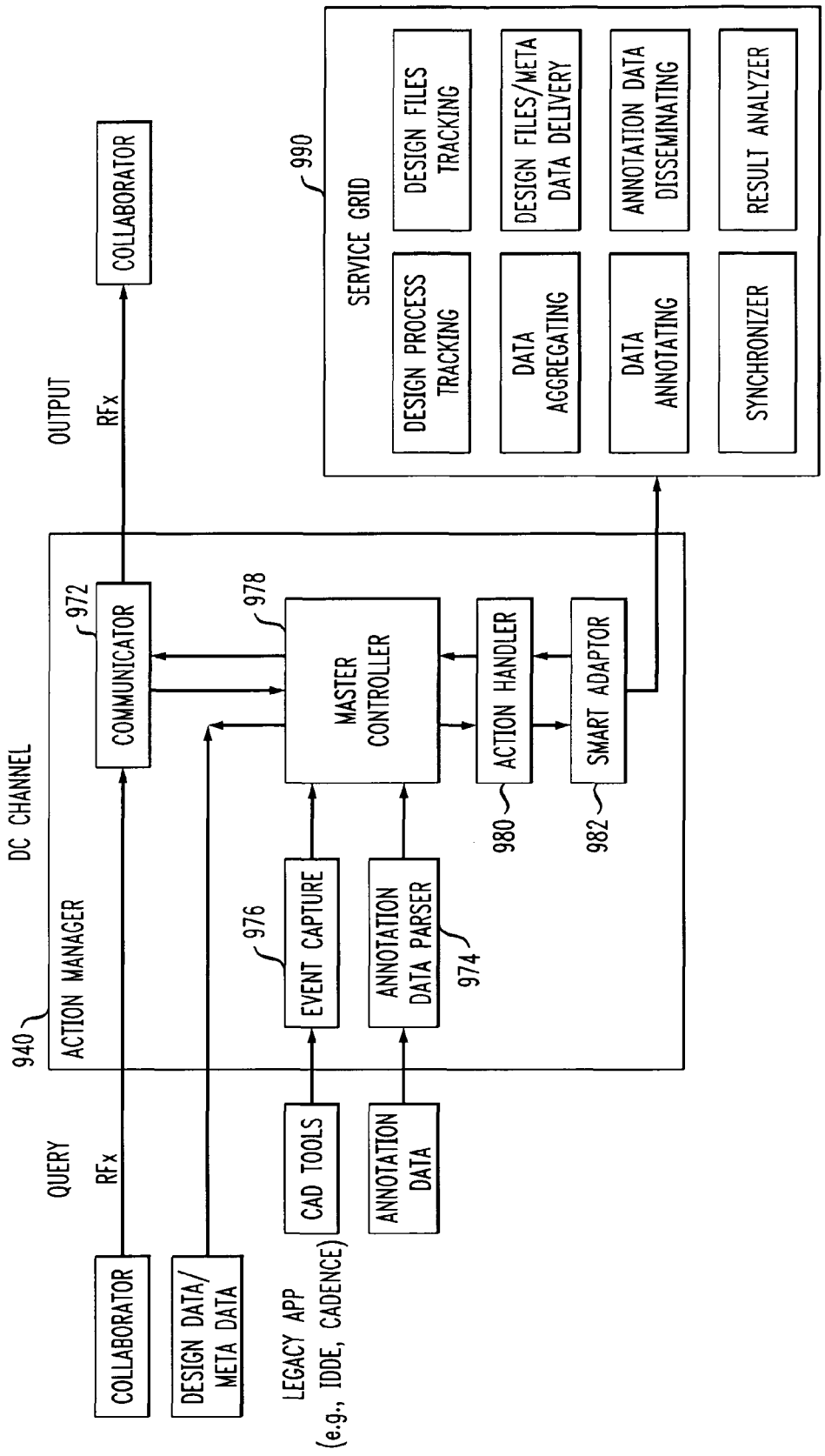
FIG. 9B is a diagram illustrating an action manager of a hyperchain manager, according to an embodiment of the present invention.

Referring now to FIG. 9B, a diagram illustrates an action manager of a hyperchain manager, according to an embodiment of the present invention. As shown in FIG. 9B, action manager 940 is responsible for processing the incoming requests and automatically allocates services for action handling from the distributed service grid 990. The action manager also intelligently aggregates data from multiple sources.

The major components of the action manager are described as follows.

Communicator 972 communicates with other collaborators for receiving requests and presenting responses. The communicator may be a Web Services Definition Language (WSDL) interface for monitoring and interaction with other collaborators.

Annotation data parser 974 parses the design hyperchain annotation data.

Event capture module 976 captures events from computer aided design (CAD) tools, such as Cadence and Catia, and then passes events to the master controller.

Master controller 978: (i) processes the events captured by the event capture module (e.g., communicate with project manager of ID&DE to extract/update the status information); (ii) performs sender/receiver verification (e.g., access control list); (iii) fetches design data, BOM data, and other metadata based on the design hyperchain annotation data; and (iv) passed actions defined in the annotation data to the action handler.

Action handler 980: (i) handles design data annotation, design data tracking, design process tracking, and design data aggregation across disparate data sources; (ii) synchronizes the collaborative process with design data and metadata; (iii) analyzes the results, suggest changes; (iv) serves as an annotation data disseminator (access control based, individual delivery, batch delivery (e.g., broadcast)); and (v) performs collaboration status tracking (e.g., who viewed design documents, what is status, when viewed, where, and which browser).

Smart adaptor 982 allocates services for action handling from the distributed service grid 990. Service grid 990 provides on-demand services deployment and delivery model in the design hyperchain engine based on the required action type and real requirements from the action handler. That is, the design parties in the design chain can request a special service deployed in the service grid 990 whenever they need it. The example services in the service grid 990 include, but are not limited to, design process tracking service, design file tracking service, data aggregation service from multiple sources, design file/meta data delivery service, data annotating service, annotation data disseminating service, data and project synchronizing service, and result analyzing service. Service grid 990 is connected with action manager 940 through the smart adaptor 982, which parses the action command from action handler 980, invokes the corresponding services deployed in the service grid, and passes the execution results from the service grid 990 to action handler 980.

Referring finally to FIG. 13, a block diagram illustrates an illustrative hardware implementation of a computing system in accordance with which one or more components/methodologies of the present invention (e.g., components/methodologies described in the context of FIGS. 1 through 12) may be implemented, according to an embodiment of the present invention. For instance, such a computing system in FIG. 13 may implement a hyperchain manager, a collaborative directory, annotation tools, etc.

It is to be understood that such individual components/methodologies may be implemented on one such computer system, or on more than one such computer system. In the case of an implementation in a distributed computing system, the individual computer systems and/or devices may be connected via a suitable network, e.g., the Internet or World Wide Web. However, the system may be realized via private or local networks. The invention is not limited to any particular network.

As shown, computer system 1300 may be implemented in accordance with a processor 1302, a memory 1304, I/O devices 1306, and a network interface 1308, coupled via a computer bus 1310 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc.

In addition, the phrase "input/output devices" or "I/O devices" as used herein is intended to include, for example, one or more input devices (e.g., keyboard, mouse, etc.) for entering data to the processing unit, and/or one or more output devices (e.g., speaker, display, etc.) for presenting results associated with the processing unit. Such output devices may also be used to present graphical user interfaces such as those shown in FIGS. 10-12.

Still further, the phrase "network interface" as used herein is intended to include, for example, one or more transceivers to permit the computer system to communicate with another computer system via an appropriate communications protocol.

Accordingly, software components including instructions or code for performing the methodologies described herein may be stored in one or more of the associated memory devices (e.g., ROM, fixed or removable memory) and, when ready to be utilized, loaded in part or in whole (e.g., into RAM) and executed by a CPU.

Advantageously, as explained in detail herein, the present invention provides: (i) a flexible and uniform annotation representation for information exchange of various non-structured data without requiring pre-defined schemas; (ii) a collaboration pattern enabling framework that covers all aspects of a non-structural and non-deterministic information exchange flow based on the annotation data; (iii) an efficient on-demand information manager that dynamically locates resources from the non-structural relationship graph as well as intelligently aggregates data from multiple sources; and (iv) a trackable information embedding mechanism for visibility control that addresses key issues associated with data exchange in collaborative environment.

By way of example, and based on details described herein, the invention provides data constructs for on-demand business collaboration. Further, the invention provides a data specification model for business collaboration exchange functions comprising: (i) a specification of a data content container for the collaboration exchange function; an annotation mechanism to indicate organizational data entities including, but not limited to, project, task (project and task may be hierarchical, and all entities and annotation can be hierarchical), and related specifications and associated control activities specification data; (ii) an annotation mechanism to uniquely specify collaborating entities (includes individuals) including, but not limited to, profile data or profile data access links; (iii) an annotation mechanism to uniquely specify type of content pertinent for collaborating entities and collaboration activities including, but not limited to, specifications such as product specification or structure pointers to the specifications; (iv) an annotation mechanism to specify any access control information relating to restricting access based on entitlement as specified in the profile data to the content; (v) an annotation mechanism to specify dependency information for the organizational data entities; (vi) an annotation mechanism to specify a type of business construct defining collaboration activity; (vii) a mechanism for indicating collaborative shared space or spaces for collaborating entities to facilitate shared storage and instant message exchanges particular to the collaboration activities; and (viii) additional annotation properties to indicate with name/value pair further data needs to complete definitions of organizational data entities or collaboration activities.

The invention further provides data creation and storage infrastructure for on-demand business collaboration. For example, a method of creating data constructs for on-demand business collaboration may comprise: (i) creating one or more data content containers to initialize the data constructs using manual, graphic editing or automatic techniques including using computer-aided software engineering techniques; (ii) attaching an initial set of organizational data associated with the organizational data entities into the content container with an initial set of entitlement information, as described above (alternatively, such information can be extracted or propagated from directories or from previous projects between collaborating entities; (iii) similarly attaching initial collaboration activities, as described above; (iv) similarly attaching initial annotation of dependency information associated with the organizational data entities; (v) indicating one or more business constructs associated with the collaboration activity; (vi) adding any required annotation to complete initialization of organizational entities and collaboration activities and indicating collaborative space; and (vii) repeating the above initialization and annotation activities as required to complete the creation process of the initial data constructs.

Further, the invention also provides techniques for centrally or distributively storing the data constructs and other information in a collaborative directory. While not being limited thereto, the collaborative directory may comprise and/or link to: (i) entitlement storage directory; (ii) specification storage areas; (iii) business construct specification storage areas; and (iii) an access mechanism for collecting, restricting and performing data retrieval based on entitlement.

Still further, the invention also provides collaboration business constructs and patterns for on-demand business collaboration. For instance, business collaboration primitives are defined and may comprise a group of message exchange constructs including: (i) a request message with or without attached business activity documents or links; (ii) a response message with or without and attached business activity documents or links; and (iii) a logical sequence of request, response message exchange relations. Also, business construct activities are defined and may include: (i) a plurality of business collaboration primitives; (ii) a set of consistent activity annotation data; (iii) a set of sources for activity links or documents or document links; and (iv) a logical flow defining a relative execution sequence of the business collaboration primitives. Business collaboration process templates may also be defined including: (i) collaborating entities and the collaboration activities that the participants are entitled to engage in; (ii) one or more complete set of business constructs required for a business scenario and to complete a business process from start to conclusion; (iii) a set of application and application interfaces from which business constructs, links or documents originate or are the destination; and (iv) a logical flow set for activating and deploying the business constructs with the collaborating entities.

The invention may also provide collaboration management apparatus comprising: (i) a collaborative directory instance; (ii) a business construct storage indicating available business construct service and service discovery and retrieval mechanism; and (iii) a hyperchain management engine comprising a message sender and a message receiver to handle collaborative business primitives, a file transfer handler to manage secure document exchanges between collaborating entities during the execution of collaboration activities, an annotation manager that handles construction, aggregation and interpretation of data constructs for on-demand business collaboration; (iv) a mechanism to capture data needed to start collaboration functions; and (v) an operation monitoring dashboard to display status of collaboration activities and related collaborative business processes and exchanged collaborative data entities performing a minimum of capturing and aggregating data from a plurality of collaborating entities and activities, rendering and displaying activities to a user based on entitlement restrictions, and displaying action requirements to a user based on entitlement functions.

Yet further, the invention provides a method for deploying on-demand business collaboration solutions which may comprise: (i) deploying at least one collaboration management apparatus; (ii) defining at least one business collaboration process template; (iii) creating at least one set of data constructs; (iv) selecting at least one other collaborating entity for information exchange capable of acting on at least one complete set of business constructs; (v) customizing a process template (pattern) to support a selected set of business constructs; (vi) generating at least one set of activities in a business construct with initial collaborative data entities; (vii) expanding, as needed, collaborative data entities as business construct activities proceed and require additional data entities; and (viii) including additional collaborative entities as a business process template is executed and as required based on collaboration activities. Subcomponents of the collaboration management apparatus may be deployed at participating entity sites as required by the business collaboration process execution template. In the process, deployment to the data entities is limited by entitlements of collaborating entity. One or more of the deployment steps may be repeats as additional entities are engaged and additional business constructs are invoked.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method, comprising:
   storing, via a computing device, in a directory:
      collaborative information;
      a plurality of common message data models, each of the common message data models for use in forming annotated messages comprising links and metadata extracted from the collaborative information; and
      a plurality of common primitive message exchange sequences, each common primitive message exchange sequence comprising a combination of at least two common message data models, each common primitive message exchange sequence for use in an exchange of a sequence of annotated messages, the plurality of common primitive message exchange sequences comprising a first common primitive message exchange sequence comprising a first and a second common message data model;
   initiating, via a computer system configured for on-demand business collaboration, the first common primitive message exchange sequence by forming and sending a first annotated message based on the first common message data model, the first annotated message comprising links and metadata extracted from the collaborative information stored in the directory; and
   receiving, in response to the first annotated message, a second annotated message based on the second common message data model.

2. The method of claim 1, where the first common primitive message exchange sequence comprises a request for design common primitive message exchange sequence, and further comprising:
   receiving a third annotated message based on a third common message data model, where the first common primitive message exchange sequence further comprises the third common message data model combined with the first and second common message data models;
   where the first common message data model comprises a design request common message data model, and the first annotated message comprises a request for design input;
   where the second common message data model comprises an acknowledgement common message data model, and the second annotated message comprises an acknowledgement of receipt of the first annotated message; and where the third common message data model comprises a design acceptance common message data model, and the third annotated message comprises a notice that a recipient of the first annotated message has accepted the request for design input.

3. The method of claim 2, where the first common message data model comprises:
a transaction resource including a link to a sender of the first annotated message, and a link to the recipient of the first annotated message;
a task resource including a link to a task file stored in the directory, and including metadata regarding the task file;
a project resource including a link to a project file stored in the directory, and including metadata regarding the project file; and
a requirements resource including a link to first and second containers, the first container including metadata and a plurality of links to files of a first type stored in the directory, and the second container including metadata and a plurality of links to files of a second type stored in the directory.

4. The method of claim 3 where the first annotated message comprises:
an access control policy, the access control policy requiring proper identity and authorization for the recipient of the first annotated message to access the first annotated message; and
status information to enable tracking of a collaborative process.

5. The method of claim 1, where the plurality of common primitive message exchange sequences further comprises a second common primitive message exchange sequence comprising a third and a fourth common message data model, further comprising:
storing, in the directory, a plurality of common construct message exchange sequences, each common construct message exchange sequence comprising a combination of at least two common primitive message exchange sequences, each common construct message exchange sequence for use in an exchange of sequences of common primitive message exchange sequences, the plurality of common construct message exchange sequences comprising a first common construct message exchange sequence comprising the first and the second common primitive message exchange sequences; and
completing the first common construct message exchange sequence by exchanging a third and a fourth annotated message, the third annotated message being based on the third common message data model, and the fourth annotated message being based on the fourth common message data model.

6. The method of claim 5, where:
the first common construct message exchange sequence comprises a request for design common construct message exchange sequence;
the first common primitive message exchange sequence comprises a request for design input; and
the second common primitive message exchange sequence comprises a submission of a design.

7. The method of claim 5, where:
the first common construct message exchange sequence comprises a request for update common construct message exchange sequence;
the first common primitive message exchange sequence comprises a request for update input; and
the second common primitive message exchange sequence comprises an update submission.

8. The method of claim 5, where:
the first common construct message exchange sequence comprises a request for information common construct message exchange sequence;
the first common primitive message exchange sequence comprises a request for information input; and
the second common primitive message exchange sequence comprises an information submission.

9. The method of claim 5, where the first common message data model comprises:
a transaction resource including a link to a sender of the first annotated message, and a link to a recipient of the first annotated message;
a task resource including a link to a task file stored in the directory, and including metadata regarding the task file;
a project resource including a link to a project file stored in the directory, and including metadata regarding the project file; and
a requirements resource including a link to first and second containers, the first container including metadata and a plurality of links to files of a first type stored in the directory, and the second container including metadata and a plurality of links to files of a second type stored in the directory.

10. The method of claim 9, where the first annotated message comprises:
an access control policy, the access control policy requiring proper identity and authorization for the recipient of the first annotated message to access the first annotated message; and
status information to enable tracking of a collaborative process.

11. The method of claim 1, where the first common message data model comprises:
a transaction resource including a link to a sender of the first annotated message, and a link to a recipient of the first annotated message;
a task resource including a link to a task file stored in the directory, and including metadata regarding the task file;
a project resource including a link to a project file stored in the directory, and including metadata regarding the project file; and
a requirements resource including a link to first and second containers, the first container including metadata and a plurality of links to files of a first type stored in the directory, and the second container including metadata and a plurality of links to files of a second type stored in the directory.

12. The method of claim 11, where the first annotated message comprises:
an access control policy, the access control policy requiring proper identity and authorization for the recipient of the first annotated message to access the first annotated message; and
status information to enable tracking of a collaborative process.

13. A computer program product comprising a computer readable storage medium including a computer readable program, where the computer readable program when executed on a computer causes the computer to:
store in a directory:
collaborative information;
a plurality of common message data models, each of the common message data models for use in forming annotated messages comprising links and metadata extracted from the collaborative information; and a plurality of common primitive message exchange sequences, each common primitive message exchange sequence comprising a combination of at least two common message data models, each common primitive message exchange sequence for use in an exchange of a sequence of annotated messages, the plurality of common primitive message exchange sequences comprising a first common primitive message exchange sequence comprising a first and a second common message data model;

initiate the first common primitive message exchange sequence by forming and sending a first annotated message based on the first common message data model, the first annotated message comprising links and metadata extracted from the collaborative information stored in the directory; and receive, in response to the first annotated message, a second annotated message based on the second common message data model.

14. The computer program product of claim 13, where the first common primitive message exchange sequence comprises a request for design common primitive message exchange sequence, and where the computer readable program when executed on the computer further causes the computer to:

receive a third annotated message based on a third common message data model, where the first common primitive message exchange sequence further comprises the third common message data model combined with the first and second common message data models;

where the first common message data model comprises a design request common message data model, and the first annotated message comprises a request for design input;

where the second common message data model comprises an acknowledgement common message data model, and the second annotated message comprises an acknowledgement of receipt of the first annotated message; and where the third common message data model comprises a design acceptance common message data model, and the third annotated message comprises a notice that a recipient of the first annotated message has accepted the request for design input.

15. The computer program product of claim 14, where the first common message data model comprises:

a transaction resource including a link to a sender of the first annotated message, and a link to the recipient of the first annotated message;

a task resource including a link to a task file stored in the directory, and including metadata regarding the task file;

a project resource including a link to a project file stored in the directory, and including metadata regarding the project file; and a requirements resource including a link to first and second containers, the first container including metadata and a plurality of links to files of a first type stored in the directory, and the second container including metadata and a plurality of links to files of a second type stored in the directory.

16. The computer program product of claim 15, where the first annotated message comprises:

an access control policy, the access control policy requiring proper identity and authorization for the recipient of the first annotated message to access the first annotated message; and status information to enable tracking of a collaborative process.

17. The computer program product of claim 13, where the plurality of common primitive message exchange sequences further comprises a second common primitive message exchange sequence comprising a third and a fourth common message data model, and where the computer readable program when executed on the computer further causes the computer to:

store, in the directory, a plurality of common construct message exchange sequences, each common construct message exchange sequence comprising a combination of at least two common primitive message exchange sequences, each common construct message exchange sequence for use in an exchange of sequences of common primitive message exchange sequences, the plurality of common construct message exchange sequences comprising a first common construct message exchange sequence comprising the first and the second common primitive message exchange sequences; and complete the first common construct message exchange sequence by exchanging a third and a fourth annotated message, the third annotated message being based on the third common message data model, and the fourth annotated message being based on the fourth common message data model.

18. The computer program product of claim 17, where:

the first common construct message exchange sequence comprises a request for design common construct message exchange sequence;

the first common primitive message exchange sequence comprises a request for design input; and the second common primitive message exchange sequence comprises a submission of a design.

19. The computer program product of claim 17, where:

the first common construct message exchange sequence comprises a request for update common construct message exchange sequence;

the first common primitive message exchange sequence comprises a request for update input; and the second common primitive message exchange sequence comprises an update submission.

20. The computer program product of claim 17, where:

the first common construct message exchange sequence comprises a request for information common construct message exchange sequence;

the first common primitive message exchange sequence comprises a request for information input; and the second common primitive message exchange sequence comprises an information submission.

21. The computer program product of claim 17, where the first common message data model comprises:

a transaction resource including a link to a sender of the first annotated message, and a link to a recipient of the first annotated message;

a task resource including a link to a task file stored in the directory, and including metadata regarding the task file;

a project resource including a link to a project file stored in the directory, and including metadata regarding the project file; and a requirements resource including a link to first and second containers, the first container including metadata and a plurality of links to files of a first type stored in the directory, and the second container including metadata and a plurality of links to files of a second type stored in the directory.

22. The computer program product of claim 21, where the first annotated message comprises:

an access control policy, the access control policy requiring proper identity and authorization for the recipient of the first annotated message to access the first annotated message; and status information to enable tracking of a collaborative process.

23. The computer program product of claim 13, where the first common message data model comprises:

a transaction resource including a link to a sender of the first annotated message, and a link to a recipient of the first annotated message;

a task resource including a link to a task file stored in the directory, and including metadata regarding the task file;

a project resource including a link to a project file stored in the directory, and including metadata regarding the project file; and a requirements resource including a link to first and second containers, the first container including metadata and a plurality of links to files of a first type stored in the directory, and the second container including metadata and a plurality of links to files of a second type stored in the directory.

24. The computer program product of claim 23, where the first annotated message comprises:

an access control policy, the access control policy requiring proper identity and authorization for the recipient of the first annotated message to access the first annotated message; and status information to enable tracking of a collaborative process.

25. A system, comprising:

a memory; and a processor programmed to:

store in a directory within the memory:

collaborative information;

a plurality of common message data models, each of the common message data models for use in forming annotated messages comprising links and metadata extracted from the collaborative information; and a plurality of common primitive message exchange sequences, each common primitive message exchange sequence comprising a combination of at least two common message data models, each common primitive message exchange sequence for use in an exchange of a sequence of annotated messages, the plurality of common primitive message exchange sequences comprising a first common primitive message exchange sequence comprising a first and a second common message data model;

initiate the first common primitive message exchange sequence by forming and sending a first annotated message based on the first common message data model, the first annotated message comprising links and metadata extracted from the collaborative information stored in the directory; and receive, in response to the first annotated message, a second annotated message based on the second common message data model.

26. The system of claim 25, where the first common primitive message exchange sequence comprises a request for design common primitive message exchange sequence, and where the processor is further programmed to:

receive a third annotated message based on a third common message data model, where the first common primitive message exchange sequence further comprises the third common message data model combined with the first and second common message data models;

where the first common message data model comprises a design request common message data model, and the first annotated message comprises a request for design input;

where the second common message data model comprises an acknowledgement common message data model, and the second annotated message comprises an acknowledgement of receipt of the first annotated message; and where the third common message data model comprises a design acceptance common message data model, and the third annotated message comprises a notice that a recipient of the first annotated message has accepted the request for design input.

27. The system of claim 26, where the first common message data model comprises:

a transaction resource including a link to a sender of the first annotated message, and a link to a recipient of the first annotated message;

a task resource including a link to a task file stored in the directory, and including metadata regarding the task file;

a project resource including a link to a project file stored in the directory, and including metadata regarding the project file; and a requirements resource including a link to first and second containers, the first container including metadata and a plurality of links to files of a first type stored in the directory, and the second container including metadata and a plurality of links to files of a second type stored in the directory.

28. The system of claim 27, where the first annotated message comprises:

an access control policy, the access control policy requiring proper identity and authorization for the recipient of the first annotated message to access the first annotated message; and status information to enable tracking of a collaborative process.

29. The system of claim 25, where the plurality of common primitive message exchange sequences further comprises a second common primitive message exchange sequence comprising a third and a fourth common message data model, and where the processor is further programmed to:

store, in the directory, a plurality of common construct message exchange sequences, each common construct message exchange sequence comprising a combination of at least two common primitive message exchange sequences, each common construct message exchange sequence for use in an exchange of sequences of common primitive message exchange sequences, the plurality of common construct message exchange sequences comprising a first common construct message exchange sequence comprising the first and the second common primitive message exchange sequences; and complete the first common construct message exchange sequence by exchanging a third and a fourth annotated message, the third annotated message being based on the third common message data model, and the fourth annotated message being based on the fourth common message data model.

30. The system of claim 29, where:

the first common construct message exchange sequence comprises a request for design construct message exchange sequence;

the first common primitive message exchange sequence comprises a request for design input; and the second common primitive message exchange sequence comprises a submission of a design.

31. The system of claim 29, where:
the first common construct message exchange sequence comprises a request for update common construct message exchange sequence;
the first common primitive message exchange sequence comprises a request for update input; and
the second common primitive message exchange sequence comprises an update submission.

32. The system of claim 29, where:
the first common construct message exchange sequence comprises a request for information common construct message exchange sequence;
the first common primitive message exchange sequence comprises a request for information input; and
the second common primitive message exchange sequence comprises an information submission.

33. The system of claim 29, where the first common message data model comprises:
a transaction resource including a link to a sender of the first annotated message, and a link to a recipient of the annotated first message;
a task resource including a link to a task file stored in the directory, and including metadata regarding the task file;
a project resource including a link to a project file stored in the directory, and including metadata regarding the project file; and
a requirements resource including a link to first and second containers, the first container including metadata and a plurality of links to files of a first type stored in the directory, and the second container including metadata and a plurality of links to files of a second type stored in the directory.

34. The system of claim 33, where the first annotated message comprises:
an access control policy, the access control policy requiring proper identity and authorization for the recipient of the first annotated message to access the first annotated message; and
status information to enable tracking of a collaborative process.

35. The system of claim 25, where the first common message data model comprises:
a transaction resource including a link to a sender of the first annotated message, and a link to a recipient of the first annotated message;
a task resource including a link to a task file stored in the directory, and including metadata regarding the task file;
a project resource including a link to a project file stored in the directory, and including metadata regarding the project file; and
a requirements resource including a link to first and second containers, the first container including metadata and a plurality of links to files of a first type stored in the directory, and the second container including metadata and a plurality of links to files of a second type stored in the directory.

36. The system of claim 35, where the first annotated message comprises:
an access control policy, the access control policy requiring proper identity and authorization for the recipient of the first annotated message to access the first annotated message; and
status information to enable tracking of a collaborative process.

* * * * *